(12) United States Patent
Yao et al.

(10) Patent No.: US 11,858,065 B2
(45) Date of Patent: Jan. 2, 2024

(54) METHOD AND SYSTEM FOR USE IN LASER SHOCK PEENING AND LASER BOND INSPECTION PROCESS

(71) Applicant: LSP Technologies, Inc., Dublin, OH (US)

(72) Inventors: Tianyi Michael Yao, Worthington, OH (US); Timothy Thomas Gorman, Columbus, OH (US); Jeff L Dulaney, Delaware, OH (US)

( * ) Notice: Subject to any disclaimer, the term of this patent is extended or adjusted under 35 U.S.C. 154(b) by 664 days.

(21) Appl. No.: 16/936,260

(22) Filed: Jul. 22, 2020

(65) Prior Publication Data

US 2020/0346301 A1  Nov. 5, 2020

Related U.S. Application Data

(63) Continuation-in-part of application No. 15/541,584, filed as application No. PCT/US2016/012666 on Jan. 8, 2016, now Pat. No. 10,819,079.

(Continued)

(51) Int. Cl.
*B23K 26/06* (2014.01)
*B23K 26/0622* (2014.01)
(Continued)

(52) U.S. Cl.
CPC ........ *B23K 26/0624* (2015.10); *B23K 26/064* (2015.10); *B23K 26/0604* (2013.01);
(Continued)

(58) Field of Classification Search
None
See application file for complete search history.

(56) References Cited

U.S. PATENT DOCUMENTS 5,022,033 A  6/1991  Hackell
5,127,019 A  6/1992  Epstein et al.
(Continued)

FOREIGN PATENT DOCUMENTS

CN  102334249 A  1/2012
CN  104201556 A  12/2014
(Continued)

OTHER PUBLICATIONS

Machine translation of CN104300344-A, Aug. 2023 (Year: 2023).*
(Continued)

*Primary Examiner* — Geoffrey S Evans

(57) ABSTRACT

A laser system includes an integrated fiber laser front-end, configured to generate and output a pre-amplified first pulsed laser beam having predefined beam characteristics corresponding to a user defined pulse shape and a user defined pulse width setting selection of a controller. The first pulsed laser beam is generated from a master oscillator which outputs a CW laser beam to a temporal pulse shaper, which modulates the CW laser beam to output the first pulsed laser beam in response to an electrical pulse from an arbitrary wave generator and a DC bias voltage from an automatic modulator bias control circuitry. The first pulsed laser beam is pre-amplified to an output pulsed laser beam for laser peening or laser bond inspection. A beam detector is used to monitor beam characteristics, and to generate an error signal to be sent back as a feedback signal to the controller for adjustments and corrections.

20 Claims, 16 Drawing Sheets

Related U.S. Application Data

(60) Provisional application No. 62/101,442, filed on Jan. 9, 2015.

(51) Int. Cl.
  *B23K 26/356* (2014.01)
  *B23K 26/70* (2014.01)
  *B23K 26/20* (2014.01)
  *B23K 26/064* (2014.01)

(52) U.S. Cl.
  CPC ............ *B23K 26/20* (2013.01); *B23K 26/356* (2015.10); *B23K 26/705* (2015.10)

(56) References Cited

U.S. PATENT DOCUMENTS

| | | | |
|---|---|---|---|
| 5,181,223 A | 1/1993 | Baer et al. | |
| 5,239,408 A | 8/1993 | Hackel et al. | |
| 5,268,787 A | 12/1993 | McIntyre | |
| 5,285,310 A | 2/1994 | Miller et al. | |
| 5,329,090 A | 7/1994 | Woelki et al. | |
| 5,430,748 A | 7/1995 | MacCormack et al. | |
| 5,689,363 A | 11/1997 | Dane et al. | |
| 6,057,003 A | 5/2000 | Dulaney et al. | |
| 6,075,593 A | 6/2000 | Trantow et al. | |
| 6,198,069 B1 * | 3/2001 | Hackel ................. | C21D 10/005 219/121.61 |
| 6,197,133 B1 | 6/2001 | Unternahrer | |
| 6,259,055 B1 | 7/2001 | Sokol et al. | |
| 6,366,308 B1 | 2/2002 | Hawryluk et al. | |
| 6,373,876 B1 | 4/2002 | Dulaney et al. | |
| 6,384,966 B1 | 5/2002 | Dymott et al. | |
| 6,657,160 B2 | 12/2003 | Hackel et al. | |
| 6,775,053 B2 | 8/2004 | Jovanovic | |
| 6,805,970 B2 | 10/2004 | Hackel et al. | |
| 6,818,854 B2 | 11/2004 | Friedman et al. | |
| 6,914,215 B2 | 7/2005 | Davis | |
| 6,917,012 B2 | 7/2005 | Perozek et al. | |
| 6,917,631 B2 | 7/2005 | Richardson et al. | |
| 7,006,283 B2 | 2/2006 | Lefort | |
| 7,095,761 B2 | 8/2006 | Um | |
| 7,095,772 B1 | 8/2006 | Delfyett et al. | |
| 7,110,171 B2 | 9/2006 | Dane et al. | |
| 7,110,174 B2 | 9/2006 | Dane et al. | |
| 7,180,918 B2 | 2/2007 | Dane et al. | |
| 7,209,500 B2 | 4/2007 | Dane et al. | |
| 7,233,607 B2 | 6/2007 | Richardson et al. | |
| 7,286,580 B2 | 10/2007 | Dane et al. | |
| 7,291,805 B2 | 11/2007 | Dane et al. | |
| 7,386,211 B1 | 6/2008 | Di Teodoro et al. | |
| 7,391,561 B2 | 6/2008 | Di Teodoro et al. | |
| 7,430,352 B2 | 9/2008 | Di Teodoro et al. | |
| 7,440,175 B2 | 10/2008 | Di Teodoro et al. | |
| 7,508,853 B2 | 3/2009 | Harter et al. | |
| 7,558,302 B1 | 7/2009 | Defyett et al. | |
| 7,573,001 B2 | 8/2009 | Dane et al. | |
| 7,718,921 B2 | 5/2010 | Dane et al. | |
| 7,750,266 B2 | 7/2010 | Dane et al. | |
| 7,782,912 B2 | 8/2010 | Harter et al. | |
| 7,851,725 B2 | 12/2010 | Dane et al. | |
| 8,049,137 B2 | 11/2011 | Holman et al. | |
| 8,094,691 B2 | 1/2012 | Harter et al. | |
| 8,207,474 B2 | 6/2012 | Dane et al. | |
| 8,233,511 B2 | 7/2012 | Bayramian | |
| 8,509,270 B2 | 8/2013 | Harter et al. | |
| 8,526,473 B2 | 9/2013 | Baird et al. | |
| 9,744,618 B2 | 8/2017 | Sokol | |
| 10,232,470 B2 | 3/2019 | Sokol | |
| 2002/0000428 A1 | 1/2002 | Dulaney et al. | |
| 2002/0031158 A1 | 3/2002 | Kleinschmidt | |
| 2002/0096503 A1 | 7/2002 | Hackel et al. | |
| 2003/0058542 A1 | 3/2003 | Akiyama et al. | |
| 2003/0062468 A1 | 4/2003 | Byren et al. | |
| 2003/0026300 A1 | 6/2003 | Biedron et al. | |
| 2003/0161375 A1 | 8/2003 | Filgas et al. | |
| 2004/0136430 A1 | 7/2004 | Tsunekane et al. | |
| 2004/0179571 A1 | 9/2004 | Govorkov et al. | |
| 2004/0228376 A1 | 11/2004 | Dane et al. | |
| 2005/0094250 A1 | 5/2005 | Dane et al. | |
| 2005/0120803 A1 | 6/2005 | Sokol et al. | |
| 2006/0102609 A1 | 5/2006 | Dane et al. | |
| 2007/0091948 A1 | 4/2007 | Di Teodoro et al. | |
| 2007/0104230 A1 | 5/2007 | Kopf et al. | |
| 2009/0245301 A1 | 10/2009 | Peng et al. | |
| 2010/0177794 A1 | 7/2010 | Peng et al. | |
| 2010/0197116 A1 | 8/2010 | Shah et al. | |
| 2010/0208248 A1 | 8/2010 | Ochiai et al. | |
| 2011/0058249 A1 | 3/2011 | Erlandson | |
| 2011/0222573 A1 * | 9/2011 | Hann ................. | H01S 3/0675 372/70 |
| 2011/0253690 A1 | 10/2011 | Dane et al. | |
| 2011/0261844 A1 | 10/2011 | Abe et al. | |
| 2012/0092755 A1 | 4/2012 | Baird et al. | |
| 2012/0152918 A1 | 6/2012 | Li et al. | |
| 2012/0255935 A1 * | 10/2012 | Kakui ................. | B23K 26/40 219/121.6 |
| 2012/0325788 A1 | 12/2012 | Sokol et al. | |
| 2013/0250285 A1 | 9/2013 | Bridges et al. | |
| 2014/0300951 A1 | 10/2014 | Messerly et al. | |
| 2015/0090771 A1 | 4/2015 | Furfari et al. | |
| 2015/0147545 A1 | 5/2015 | Roland et al. | |
| 2015/0311666 A1 * | 10/2015 | Fermann ............ | H01S 3/08013 359/341.1 |
| 2015/0336208 A1 | 11/2015 | Sokol et al. | |
| 2015/0362293 A1 | 12/2015 | Strauss | |
| 2016/0164243 A1 * | 6/2016 | Zhao ................. | G02B 27/283 359/337.2 |
| 2018/0001417 A1 | 1/2018 | Dulaney et al. | |
| 2020/0049665 A1 * | 2/2020 | Safai ................. | G01N 29/225 |

FOREIGN PATENT DOCUMENTS

| | | | |
|---|---|---|---|
| CN | 104300344 A * | 1/2015 | ............ H01S 3/067 |
| CN | 108718029 A * | 10/2018 | |
| EP | 1511134 A2 | 3/2005 | |
| EP | 1905140 A1 | 4/2008 | |
| JP | 2002057395 A | 2/2002 | |
| JP | 2004227011 A | 8/2004 | |
| JP | 2005045211 A | 2/2005 | |
| JP | 2007514307 | 5/2007 | |
| JP | 2008122985 A | 5/2008 | |
| JP | 2008520822 | 6/2008 | |
| JP | 200246468 | 9/2009 | |
| JP | 2009265683 A | 11/2009 | |
| JP | 201020285 | 1/2010 | |
| JP | 201223397 | 2/2012 | |
| JP | 2012509464 | 4/2012 | |
| JP | 2012515450 | 7/2012 | |
| JP | 2014504956 | 2/2014 | |
| WO | 9215985 A1 | 9/1992 | |
| WO | 9525821 A1 | 9/1995 | |
| WO | WO-2013093577 A1 * | 6/2013 | ........... H01S 3/0078 |
| WO | 2014007900 A2 | 1/2014 | |
| WO | 2020072512 A1 | 4/2020 | |

OTHER PUBLICATIONS

Machine translation of CN108718029-A, Aug. 2023 (Year: 2023).*
Notice of Requisition issued in Canadian Patent Application No. 2,973,382, dated May 3, 2022.
Notice of Requisition issued in Canadian Patent Application No. 2,973,382, dated Mar. 21, 2022.
International Preliminary Report on Patentability issued in PCT/US2020/043125 dated Jan. 24, 2023.
Notice of Requisition issued in Canadian Patent Application No. 2,973,382, dated May 4, 2022.
International Search Report in International Application No. PCT/US2016/012666, dated May 17, 2016 (20 pages).
State Intellectual Property Office of the P.R.C., Chinese Office Action issued in Chinese Application No. 201680003518.8, dated Jul. 17, 2018 (8 pages).

(56) References Cited

OTHER PUBLICATIONS

European Patent Office, Supplementary Partial European Search Report and Provisional Opinion in European Patent Application No. 16735482.8, dated Sep. 17, 2018 (15 pages).
State Intellectual Property Office of the P.R.C., Second Office Action issued in Chinese Application No. 201680003518.8, dated Dec. 17, 2018 (9 pages).
Esherick, P. et al., "Polarization feedback stabilization of an injection-seeded Nd:YAG laser for spectroscopic applications," Journal of the Optical Society of America—B, vol. 4, No. 1, Jan. 1987, pp. 41-47, XP000709832, ISSN: 0740-3224 (7 pages).
Slipchenko, M.N. et al., "100 KHz, 100 ms, 400 J burst-mode laser with dual-wavelength diode-pumped amplifiers," Optics Letters, vol. 39, No. 16, Aug. 15, 2014, pp. 4735-4738, XP001591411, ISSN: 0146-9592 (4 pages).
Yu, J. et al., "125-mJ diode-pumped injection-seeded Ho:Tm:YLF Laser," Optics Letters, vol. 23, No. 10, May 15, 1998, pp. 780-782, XP000765393, ISSN: 0146-9592 (3 pages).
European Patent Office, Extended European Search Report in European Patent Application No. 19191239, dated Nov. 29, 2019 (13 pages).
Fuest, F. et al., "Ultrahigh laser pulse energy and power generation at 10 kHz," Optics Letters, vol. 37, No. 15, Aug. 1, 2012, pp. 3231-3233, ISSN: 0146-9592 (3 pages).
Japanese Patent Office, Notice of Reasons for Refusal issued in Japanese Patent Application No. 2017-536859, dated Feb. 4, 2020 (5 pages).
State Intellectual Property Office of the P.R.C., First Office Action issued in Chinese Application No. 201910851274.4, dated Dec. 17, 2018 (9 pages).
European Patent Office, Supplementary European Search Report and Opinion in European Patent Application No. 16735482.8, dated Jan. 4, 2019 (19 pages).
Indian Patent Office, First Examination Report issued in Indian Patent Application No. 201717024612, dated Nov. 28, 2020 (7 pages).
United States Patent and Trademark Office, Non-Final Office Action in U.S. Appl. No. 17/027,632, dated May 25, 2023 (22 pages).

* cited by examiner 100 ps Optical Pulse

Optical Jitter and Rise Time @10 ns, 10 kHz

METHOD AND SYSTEM FOR USE IN LASER SHOCK PEENING AND LASER BOND INSPECTION PROCESS

CROSS REFERENCE TO RELATED APPLICATIONS

This application is a continuation-in-part application of U.S. patent application Ser. No. 15/541,584, titled "Method And Apparatus For Use In Laser Shock Peening Process," filed on Jul. 5, 2017, which is a national stage application of International Application PCT/US2016/012666, titled "Method And Apparatus For Use In Laser Shock Peening Process," filed on Jan. 8, 2016, which claims priority to U.S. Provisional Application Ser. No. 62/101,442, titled "Diode Pumped Solid State Laser Shock Peening System, filed on Jan. 9, 2015. This application makes reference to International Application PCT/US2019/054094, titled "Systems, Methods And Apparatuses For Launching Laser Beams into Multiple Fibers and/or Combining Beam," filed on Oct. 1, 2019, and also makes reference to U.S. Provisional Application Ser. No. 62/987,172, titled "Method And Apparatus For Pulsed Laser Beam Control in Laser Shock Peening Process, filed on Mar. 8, 2020, all of which are herein incorporated by reference in their entirety.

TECHNICAL FIELD

The present application relates to arbitrary pulsed laser beam generation for use in laser shock peening process and for use in laser bond inspection process.

BACKGROUND

Laser shock peening, also known as "laser peening" and "LSP," a substitute or complementary process for traditional shot peening, is a cold working process used to produce a deep (e.g., more than 1 mm) compressive residual stress layer and modify mechanical properties of materials by impacting the material with enough force to create plastic deformation. The residual stresses created by the LSP process increase a material's resistance to fatigue and stress, and thereby significantly increase the life of laser peened parts. LSP uses high energy laser pulses to generate a plasma plume and cause a rapid rise of pressure on the surface of a part. This pressure creates and sustains a high-intensity shockwave, which propagates into the surface of the part. The shockwave generated by LSP induces cold work into the microstructure of the part material and contributes to the increased performance of the part.

As the shockwave travels into the part, some of the energy of the wave is absorbed during the plastic deformation of the part material. This is also known as cold working. LSP typically uses a laser pulse width of about 8 nanoseconds (ns) to about 40 ns. A typical spot diameter for a laser beam in LSP is about 1.0 mm to about 8.0 mm.

Laser pulse width is typically defined by a width of a pulse which is measured at its half power point from its peak intensity. For a Gaussian shaped pulse, the pulse energy may be approximated by an integral of the area (i.e., power over time duration) under the pulse.

In a separate application, laser bond inspection (LBI) is a nondestructive inspection method for evaluating adhesive bond strength in composite structures. LBI uses a pulsed laser system to generate a controlled stress wave which proof-tests an adhesive bond. For example, LBI may be used to develop and evaluate manufacturing processes, and to monitor bond integrity throughout the life of a structure. Further reading on LBI apparatuses and methods may be found in issued U.S. Pat. Nos. 7,509,876, 7,770,454, 7,775,122, 8,132,460, 8,156,811, 9,201,017, 9,525,261, 9,857,288, 10,048,494, 10,365,479 which are herein incorporated by reference in its entirety.

DESCRIPTION OF EMBODIMENTS

The disclosure is better understood with reference to the following drawings and description. The elements in the figures are not necessarily to scale, emphasis instead being placed upon illustrating the principles of the disclosure. Moreover, in the figures, like-referenced numerals may be designated to corresponding parts throughout the different views. Furthermore, unless otherwise stated, additional elements may intervene or be added after an output pulsed laser beam.

A narrower pulse width laser beam having a fixed energy output, a sharper rise time at a leading edge of the pulse, such as a substantially square wave pulse shape may provide a higher shocking pressure on the surface of a part in laser shock peening. Likewise, a substantially square wave pulse shape may allow a more uniform energy distribution for laser bond inspection in composite structures.

A pulsed laser beam generated by a diode pumped solid-state laser (DPSSL) oscillator has a fixed mode of operation which cannot be varied arbitrarily to generate laser beams with other pulse shapes or pulse widths for different applications. For a laser system to generate different pulse widths or different pulse shapes, one or more elements may be added externally to modify the beam pulse widths, sometimes, the laser system may need to be shut down altogether in order to change to a different laser source, thus increasing downtime to operations.

There is a need for developing a flexible laser system that can be configured to perform both laser shock peening (LSP) operations and laser bond inspection (LBI) for composite structures, where the laser system is compact, lightweight, and capable of delivering sufficient pulse energy for both LSP and LBI operations.

Figure 1:
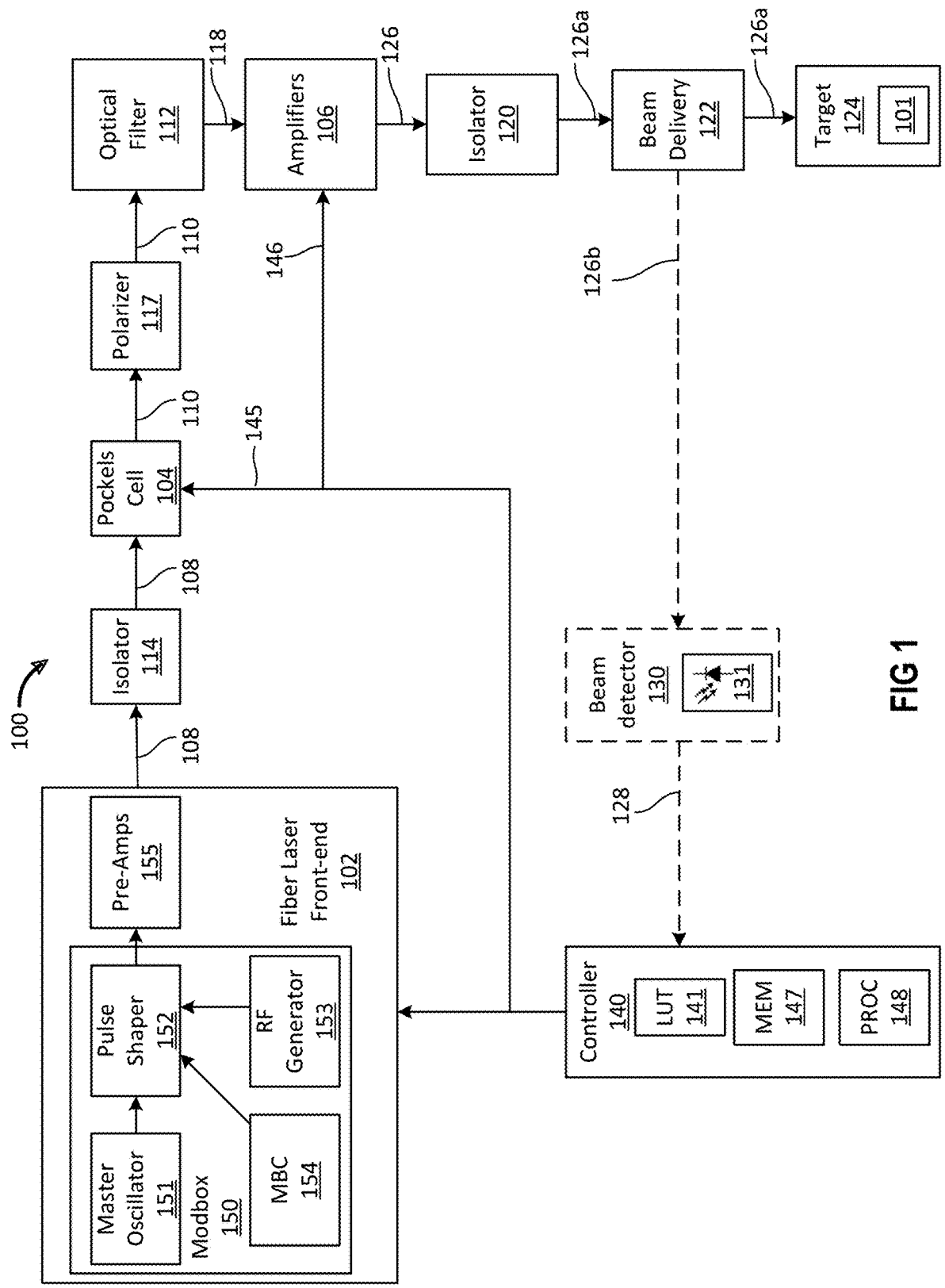
FIG. 1 is a schematic diagram of a system for arbitrary pulsed laser beam generation for use in laser shock peening process and for use in laser bond inspection process.

This problem may be solved by replacing the DPSSL oscillator with an integrated fiber laser front-end 102 as shown in FIG. 1. More specifically, FIG. 1 discloses a schematic diagram of a flexible laser system 100 which can generate arbitrary pulsed laser beams for use in laser shock peening process and for use in laser bond inspection process. The system 100 is operative to produce and output a pulsed laser beam to a target part 101 for laser shock peening or for laser bond inspection.

The laser system 100 for pulsed laser beam generation may include at least an integrated fiber laser front-end 102, a first optical isolator 114 and a second optical isolator 120, a Pockels cell 104, a polarizer 117, an optical filter 112, multi-staged amplifiers 106 and a beam delivery device 122. The laser system 100 may also include feedback paths from a sampled output beam 152$f$ (see FIG. 3B) and from sampled output beam 126$a$ at a beam delivery device (122) sent to a controller 140.

In FIG. 1, the integrated fiber laser front-end 102 may be configured by the controller 140 to generate and output a pre-amplified first pulsed laser beam 108. The first pulsed laser beam 108 may have predefined beam characteristics corresponding to a setting selection (e.g., based on a look up table LUT 141) of the controller 140, wherein the predefined beam characteristics may include: a beam frequency, a first energy, a pulse modulation frequency, a first spatial profile including a first beam diameter, a pulse shape (which may be Gaussian shape (see FIGS. 4A and 6), a square pulse shape (see FIGS. 4B to 4D) or an arbitrary pulse shape (see FIGS. 5A, 5C)) and a first temporal profile having a pulse width PW1.

In an example, the first pulsed laser beam 108 may be a monochromatic frequency Gaussian shaped pulsed laser beam (see FIG. 4A) having a wavelength of 1053 nm, wherein the pulse modulation frequency may be between 1-20 Hz, the first energy may be 10 mJ 20 ns, the pulse width PW1 may be between 100 ps (picosecond) to 500 ns (nanosecond). The first optical isolator 114 may prevent beam reflections in an opposite direction to protect the integrated fiber laser front-end 102.

A pair of Pockels cell 104 and polarizer 117 may be disposed between the first optical isolator 114 and the optical filter 112, wherein the pair of Pockels cell 104 and polarizer 117 may be configured to perform nanosecond-duration switching on the first pulsed laser beam 108, by allowing or preventing the first pulsed laser beam 108 from exiting the Pockels cell 104, wherein an exit beam is the modified first beam 110 having the modified pulse width (PW2) with the second temporal profile.

In an implementation, the Pockels cell 104 may include a crystal material containing one of: barium borate (BBO) or potassium dideuterium phosphate (KD*P). In a case where the Pockels cell 104 including the crystal material containing dideuterium phosphate (KD*P), the Pockels cell 104 may further be configured to perform pulse slicing (see FIG. 6) of a leading edge portion 656 (alternately pulse slicing both the leading edge 656 and the falling edge 660) of the first beam 108 to output the modified first beam 110 having the modified pulse width 662 (PW2 see FIG. 6) of less than 12 nanosecond (typically 5-12 nanoseconds) with the second temporal profile.

In an implementation (see FIGS. 7-8), the modified first beam 110 output from the Pockels cell 104 and polarizer 117 pair may have a first diameter d1 and wings sections (878) and the optical filter 112 may include: a beam expander 766 configured to expand the modified first beam 110 to a diameter d2, which is greater than the first diameter d1; and an apodizer 768 configured to receive the expanded first beam or the expanded modified first beam 770 from the beam expander 766, to remove the wing portions 878 to output the second beam 118 having a second spatial profile with a flat top 881 without the wing portions 878.

Figure 8:
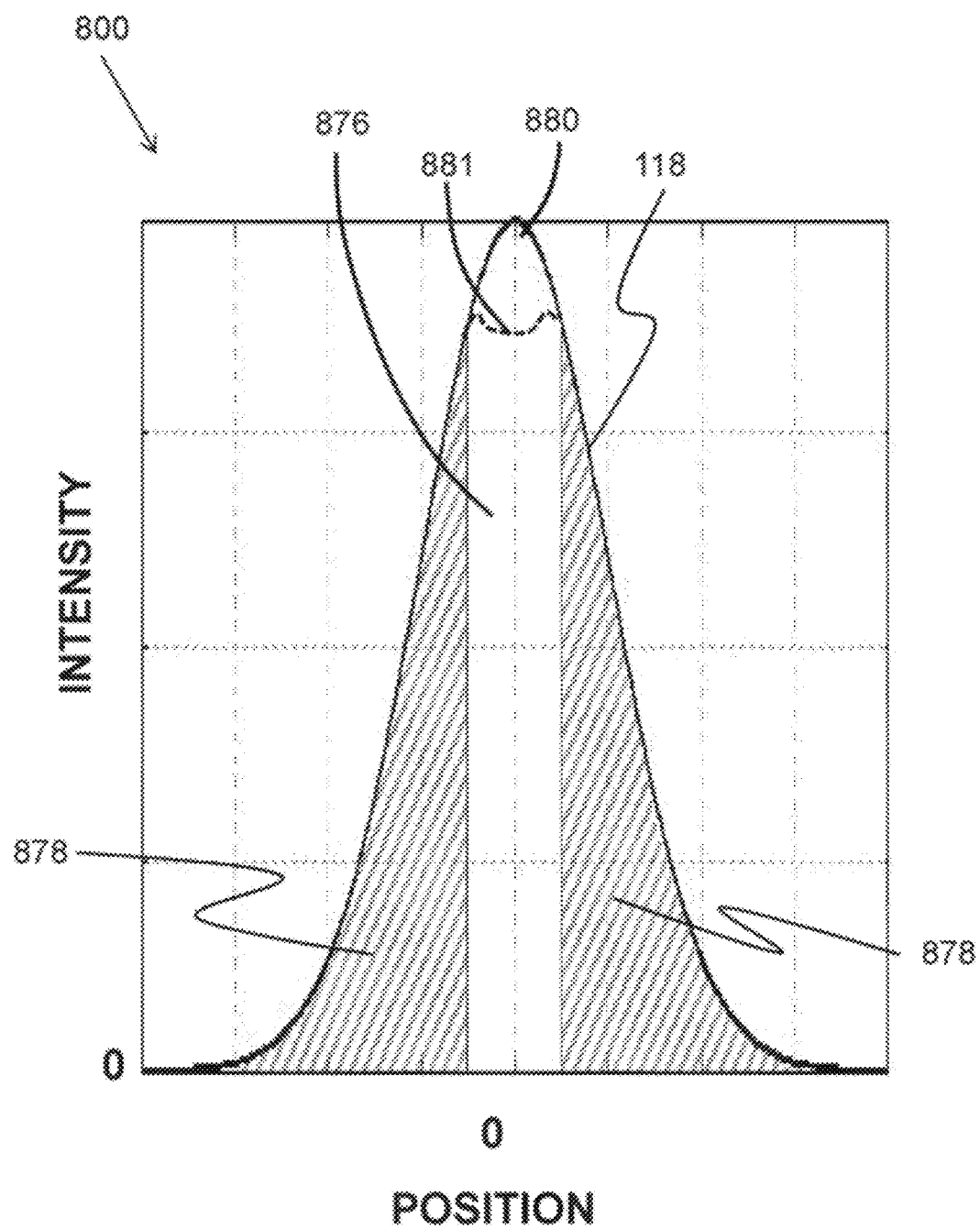
FIG. 8 is a graph of an example of spatial modification to a Gaussian shaped pulsed beam by the optical filter in FIG. 7.

An optical filter 112 may be configured to modify the (pre-amplified) modified first beam 110 to output a second beam 118 having a second energy and a second spatial profile (flat top Gaussian shaped pulse, see FIG. 8). A multi-stage post amplifier 106 may be configured to output an output beam 126 after beam energy post amplifications and beam profile modifications. The multi-stage amplifier 106 may include at least a first stage 901 (see FIG. 9) configured to post-amplify and modify the second beam 118 to output a third beam 915 having a third energy and a third temporal profile; and a second stage 902 configured to post-amplify and modify the third beam 915 to output a fourth beam 941 having a fourth energy and a fourth temporal profile, wherein the fourth beam 941 substantially maintains the pulse width (PW1) within the defined tolerance.

In an implementation, the multi-stage amplifier 106 may further include: a third stage 903 configured to amplify and modify the fourth beam 941 to output a fifth beam 959 having a fifth energy and a fifth temporal profile; and a fourth stage 904 configured to amplify and modify the fifth beam 959 to output a sixth beam or an output beam 126 having a sixth energy and a sixth temporal profile.

In an implementation (see FIG. 10), the output beam 126 from the multi-stage amplifier 106 to a beam delivery device 122 may have near field values and measurements, and the laser beam delivery device 122 may include a vacuum relay imaging module (VRIM) 1091 configured to maintain the near field values and the measurements of the output beam 126 and to deliver the output beam 126 to the target part 101.

The system 100 may include a feedback mechanism to monitor beam characteristics for beam stability (such as pulse widths, beam diameter, energy level, etc.) and to adjust certain beam settings (such as bias voltage setting, Pockels cell bias voltage, amplifier gain, etc.) in order to ensure that the pulsed laser beam operates within a prescribed performance matrix. In an implementation, a beam detector 130 (including a photodetector and a high speed oscilloscope 131) may be coupled to one or a combination of the integrated fiber laser front-end 102 and a beam delivery device 122 disposed after the multi-stage amplifier 106, for monitoring one or a combination of: a pulse shape, a beam pulse width, a beam diameter, and an energy level.

In an example of the feedback mechanism, a feedback signal 152$f$ (see FIG. 3B) may be from a sampled signal 152$f$ output by the temporal pulse shaper 152 to be sent back to the controller 140. If a magnitude of the error signal 152$f$ exceeds a defined error range, the error signal 152$f$ may cause the controller 140 to perform one or a combination of the following in the integrated fiber laser front-end 102: (a)

configure a modulator bias control (MBC) circuitry 154 to modulate a CW laser beam 151a to output a first pulsed laser beam 152a with a defined pulse shape with a defined pulse width PW1, (b) configure a RF generator 153 to output an electrical pulse 153a (see FIG. 5A) to produce an optical pulse ramp or a defined rise time (see FIGS. 5B, 5C) according to the setting selection of the LUT 141.

In another example, a feedback signal 126b may be sampled from an output signal at the beam delivery device 122 and fed to the beam detector 130 to generate an error signal 128 to be sent back to the controller 140. If a magnitude of the error signal 128 exceeds a defined error range, the error signal 128 may cause the controller 140 to perform one or a combination of the following: (c) configure the Pockels cell 104 to switch on or off, or to adjust the modified pulse width (PW2) by an amount 145 to stay within the defined tolerance; and (d) configure the multi-stage amplifier 106 with a correction gain signal 146 to adjust one or a combination of the beam energy amplifications and the beam profile modifications to stay within a defined output energy level and a defined beam profile according to the setting selection of the LUT 141.

Figure 2:
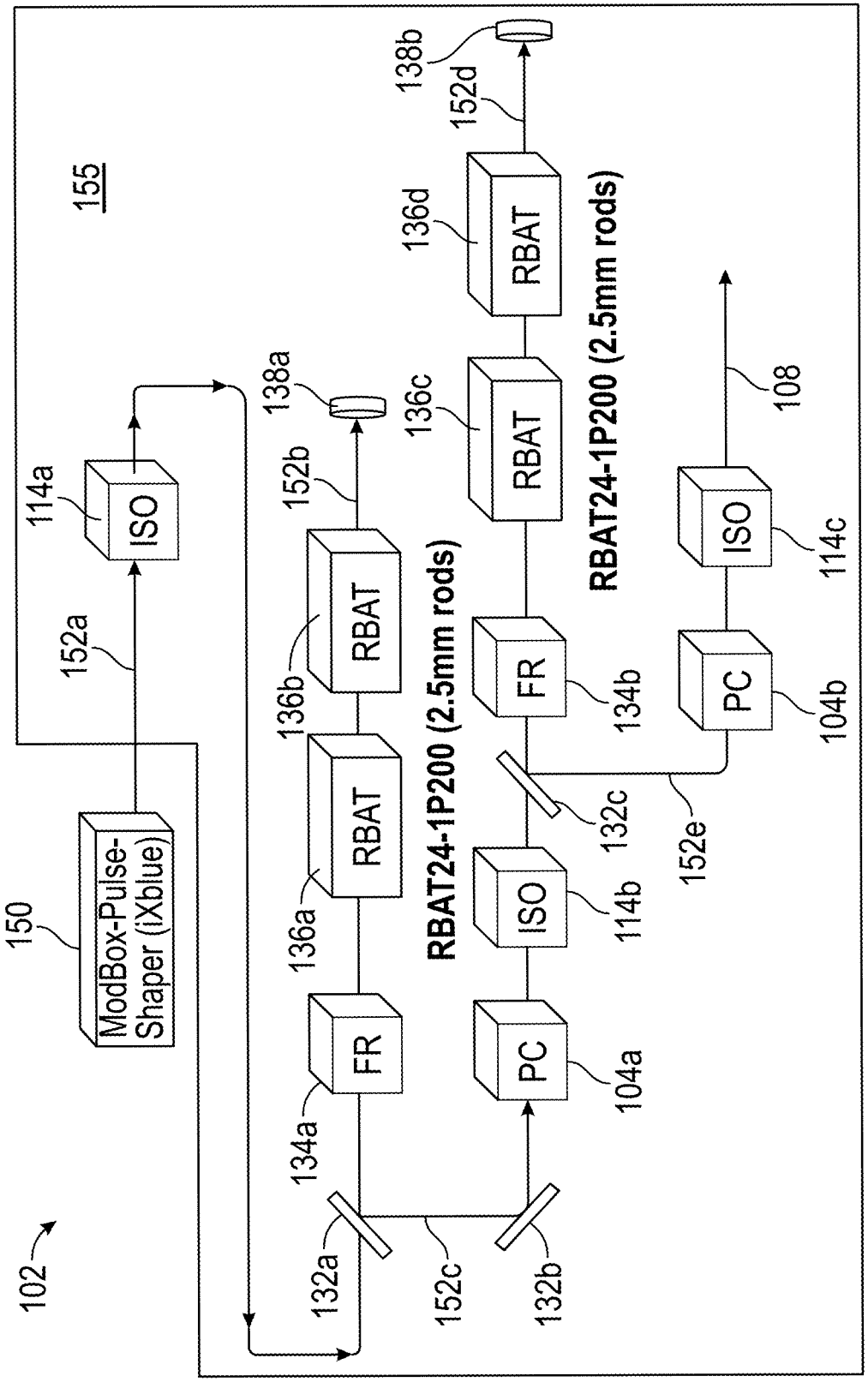
FIG. 2 is a schematic diagram of an integrated fiber laser front-end for arbitrary pulsed laser beam generation as shown in FIG. 1.
Figure 3A:
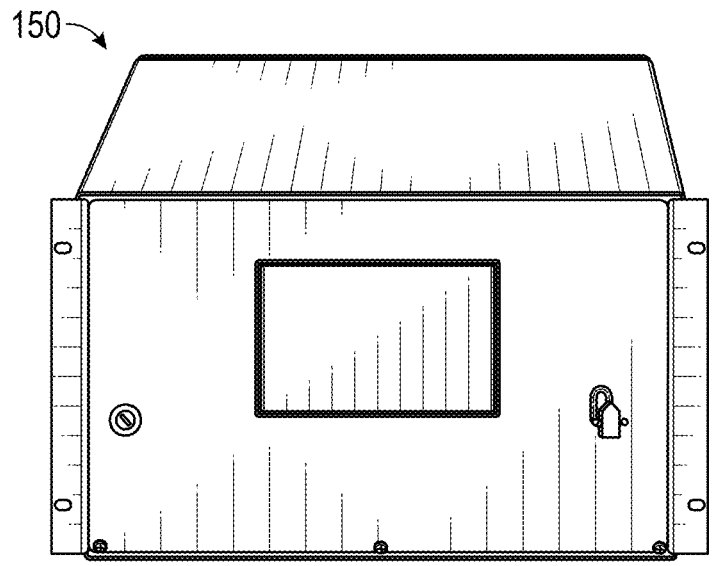
FIG. 3A is an external view of an integrated oscillator/pulse shaper (Modbox) as shown in FIG. 2.
Figure 3B:
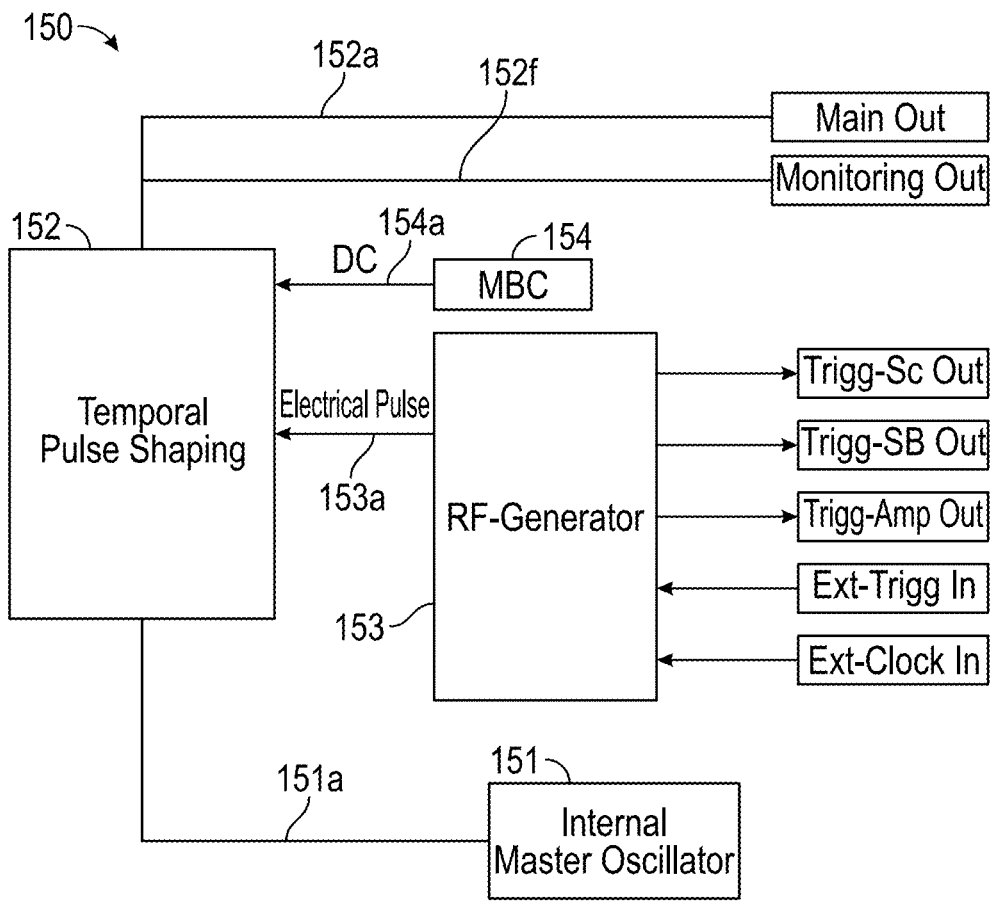
FIG. 3B is an example of a schematic of the integrated oscillator/pulse shaper (Modbox) as shown in FIG. 2.

FIG. 2 is a schematic diagram of the integrated fiber laser front-end 102 for arbitrary pulsed laser beam generation as shown in FIG. 1. The integrated fiber laser front-end 102 may include an integrated oscillator/pulse shaper 150 (see FIG. 3A) and a multi-stage preamplifier 155. FIG. 3A is an external view of an integrated oscillator/pulse shaper 150 as shown in FIG. 2. FIG. 3B is an example of a schematic of the integrated oscillator/pulse shaper 150.

As shown in FIG. 3B, the integrated oscillator/pulse shaper 150 may be a ModBox Pulse Shaper manufactured by iXblue, with a model number ModBox-FE-1053 nm-60 dB. The integrated fiber laser front-end 102 may include an integrated oscillator/pulse shaper 150 (see FIG. 3A) and a multi-stage preamplifier 155. The integrated oscillator/pulse shaper 150 further includes: a master oscillator 151 which outputs a monochromatic frequency continuous wave (CW) laser beam 151a at a first output energy level to a temporal pulse shaper 152 which in response to an electrical pulse 153a from an arbitrary wave radio frequency (RF) generator 153 and a direct current (DC) bias voltage 154a from an automatic modulator bias control (MBC) circuitry 154, modulates the CW laser beam 151a to output the first pulsed laser beam 152a with the pulse width PW1 according to the pulse width setting selection of the controller 140 through a main out port A.

Refer to FIG. 3B, as mentioned, the sampled signal 152f may be output through a monitor output port B. In an embodiment, the sampled signal 152f may be used as a feedback signal to monitor and adjust the controller to 140 to maintain the beam characteristics of the first pulsed laser beam 152a such as the pulse shape, the pulse width PW1 and the energy output to stay within a defined stability or tolerance as set by the manufacturer.

FIG. 2 also discloses a multi-stage pre-amplifier 155 which may be disposed at an output of the integrated oscillator/pulse shaper 150 to perform pre-amplification of the first pulsed laser beam 152a to output the pre-amplified first pulsed laser beam 110 prior to the post amplification. A first optical isolator 114a may be disposed between the output of the integrated oscillator/pulse shaper 150 and the multi-stage pre-amplifier 155.

In an example, a first Faraday rotator (FR1) 134a may be disposed between the first optical isolator 114a and a first portion of the multi-stage pre-amplifier (136a, 136b), wherein the FR1 performs a double pass on the first pulsed laser beam 152a by first rotating the FR1 134a to allow a forward pass of the first pulsed laser beam 152a to be first pre-amplified by the first portion of the multi-stage pre-amplifier (136a, 136b) to a first pre-amplified beam 152b, and second rotating the FR1 134a to allow a reverse pass (i.e., in opposite direction) of a second pre-amplified beam 152c, which is after the first pre-amplified beam 152b is being reflected by mirror 138a and then passing through the first portion of the multi-stage pre-amplifier (136a, 136b) to be second pre-amplified in a reversed direction to be the second pre-amplified beam 152c.

In practice, the second pre-amplified beam 152c may be reflected by a mirror 132a to be received by a first Pockels cell 104a, followed by a second isolator 114b, wherein the first Pockels cell 104a operates as a first optical switch to synchronize at an exact time the received second pre-amplified beam 152c arrives for a subsequent amplification, and the second optical isolator 114b protects the first Pockels cell 104a from damages due to reflection (i.e., reverse transmission).

The subsequent amplification includes passing the second pre-amplified beam 152c through a second Faraday rotator (FR2) 134b disposed between the second optical isolator 134b and a second portion of the multi-stage pre-amplifier (136c, 136d), wherein the FR2 134b performs a double pass on the second pre-amplified beam 152c by first rotating the second Faraday rotator (FR2) 134b to allow a forward pass of the second pre-amplified beam 152c to be third pre-amplified by the second portion of the multi-stage pre-amplifier (136c, 136d) to a third pre-amplified beam 152d, and second rotating the FR2 134b to allow a reverse pass (i.e., in opposite direction) of a fourth pre-amplified beam 152e, which is after the third pre-amplified beam 152d is being reflected by mirror 138b and then passing through the second portion of the multi-stage pre-amplifier (136c, 136d) to be fourth pre-amplified in a reversed direction to be the fourth pre-amplified beam 152e.

The fourth pre-amplified beam 152e is received by a second Pockels cell 104b followed by a third isolator 114c, wherein the second Pockels cell 104b operates as a second optical switch to synchronize with the first Pockels cell 104a at an exact time the received fourth pre-amplified beam 152e arrives for an output or for subsequent amplification. The third optical isolator 114c protects the second Pockels cell 104b from damages due to reflection (i.e., transmission in reverse direction), wherein the fourth pre-amplified beam 152e may exit through the third isolator 114c as the pre-amplified first pulsed laser beam 110 having the predefined beam characteristics corresponding to the pulse width setting selection of the controller 140.

An example of the first temporal profile may include a user defined pulse width between 100 ps (picosecond) (see FIG. 4A) to 500 ns (nanosecond), with a rise time as low as 40 ps, and the first spatial profile may exhibit anyone of a square wave pulse shape (see FIGS. 4B to 4D), a Gaussian shape (see FIG. 4A, 6), and any user defined arbitrary pulse shape. In practice, the first pulsed laser beam may be modulated with a user defined discrete repetition rate between 1 to 20 Hz.

Figure 5A:
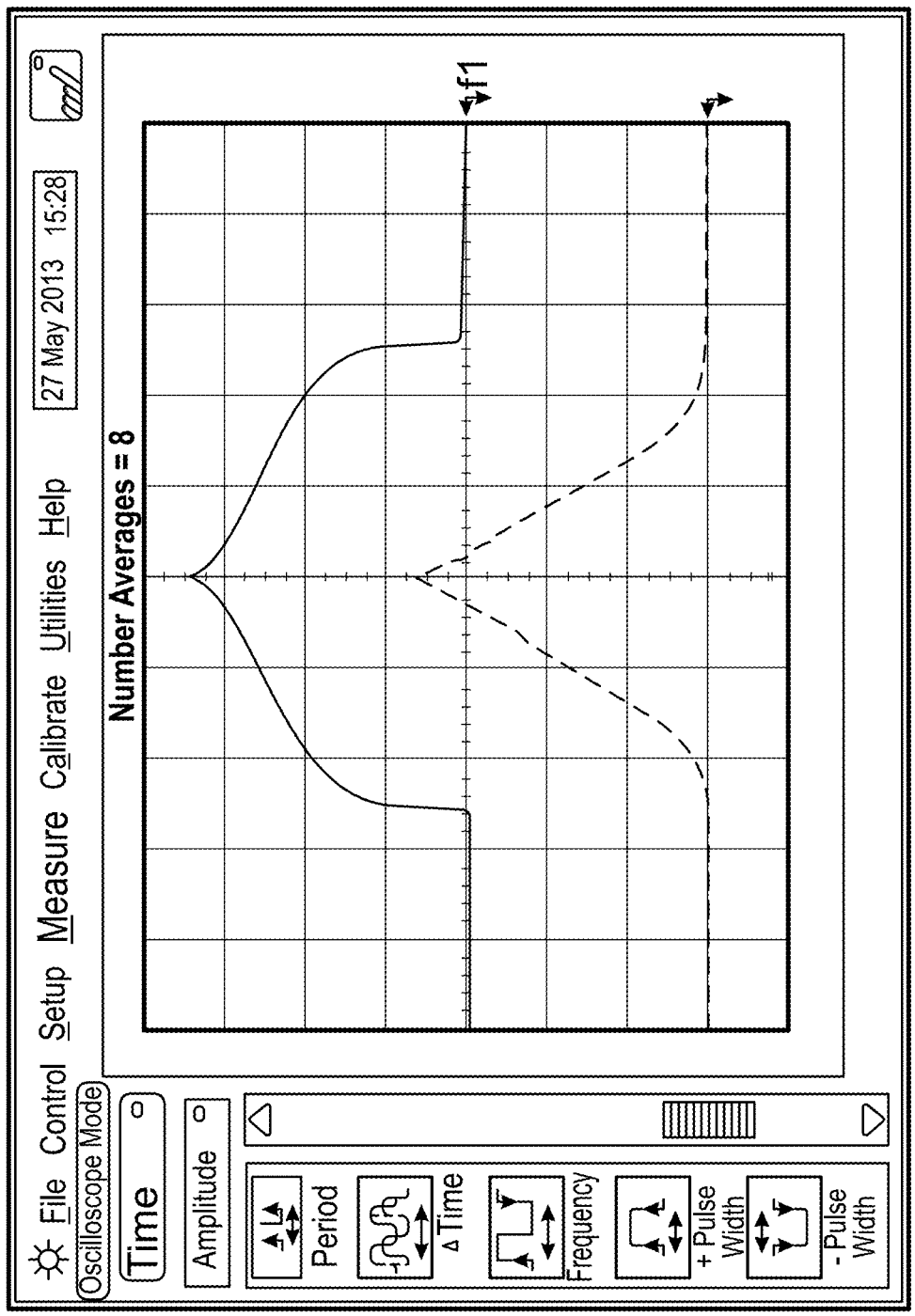
FIGS. 5A to 5C depict parameters that are used to control generation of arbitrary pulses by the Modbox as shown in FIG. 2.
Figure 5B:
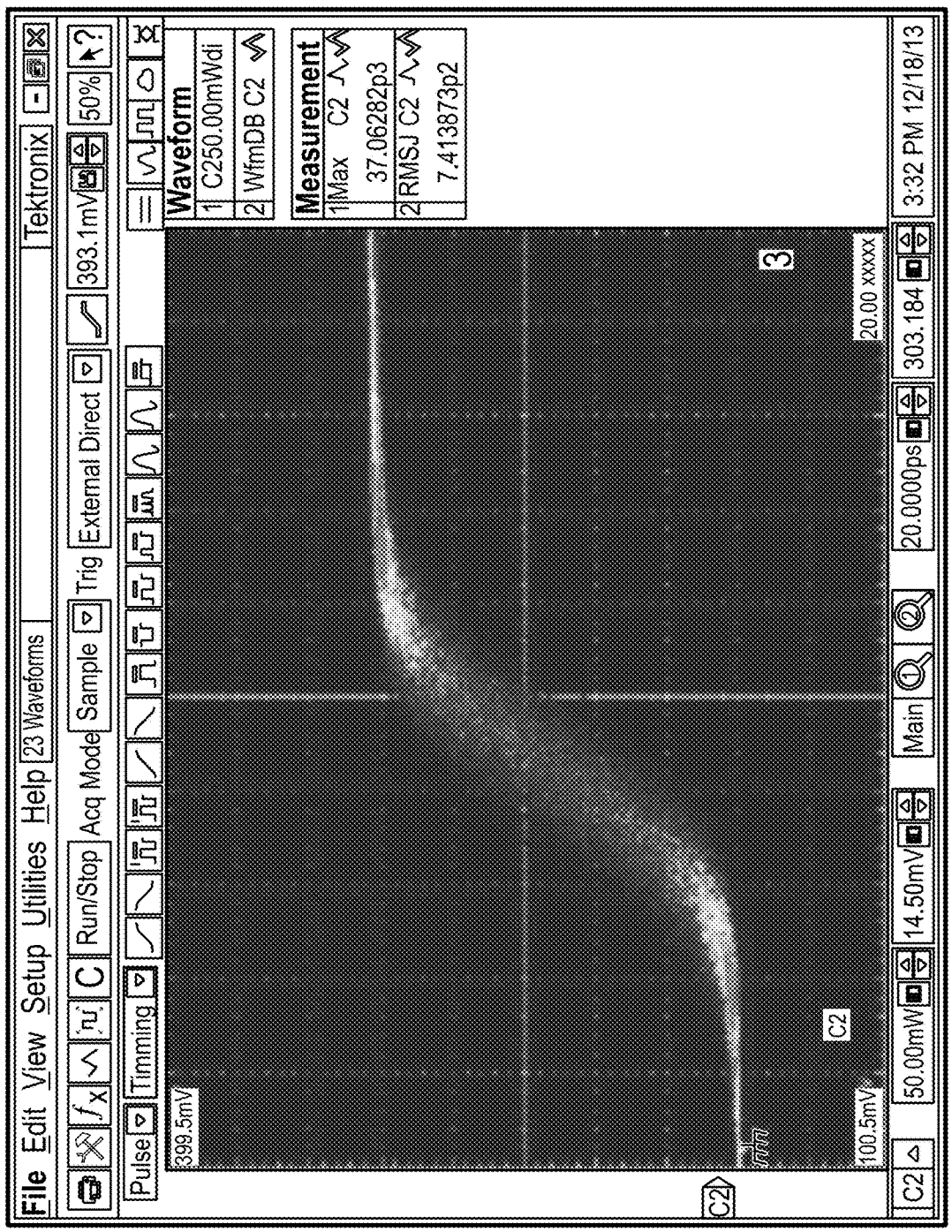
Figure 5C:
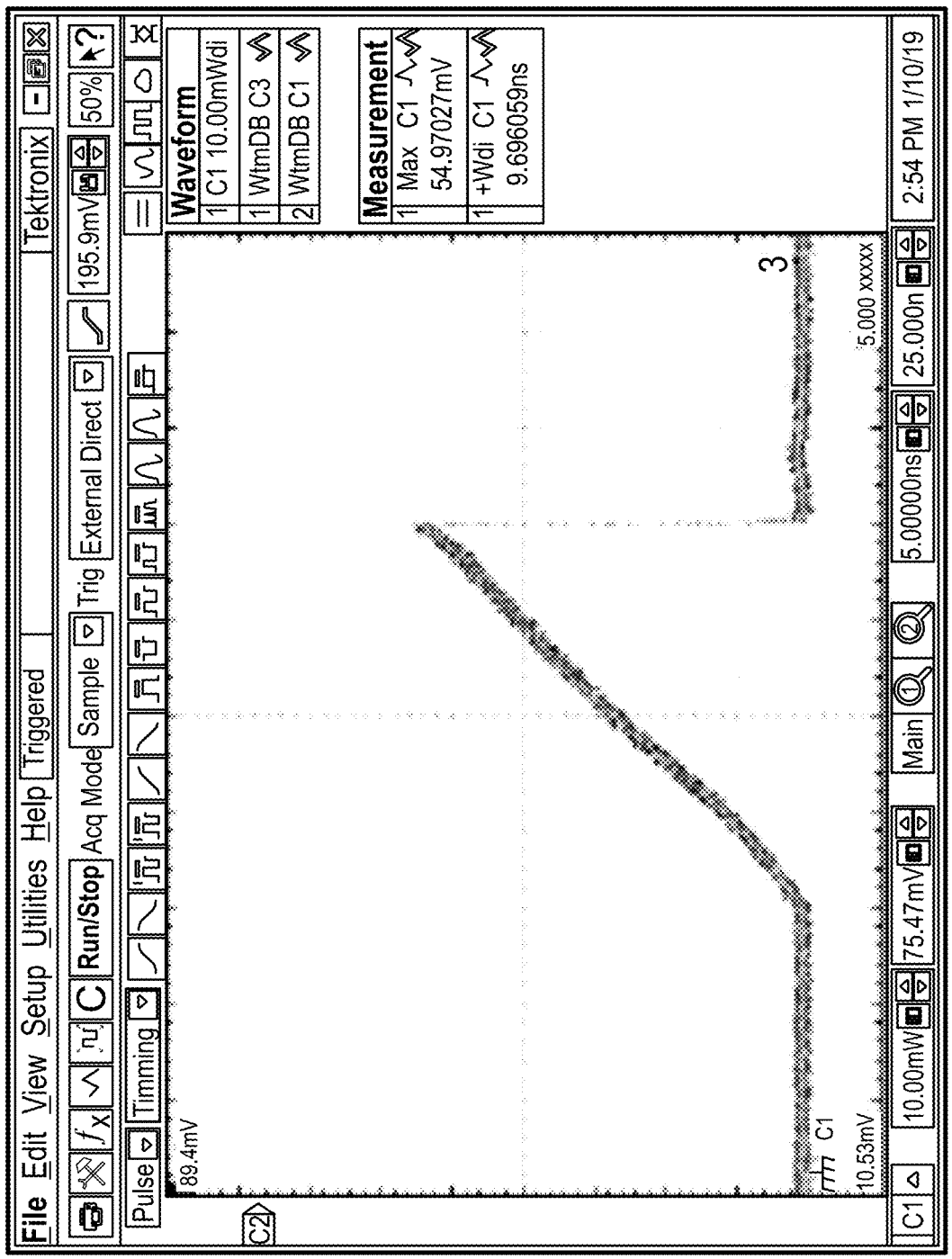
Figure 6:
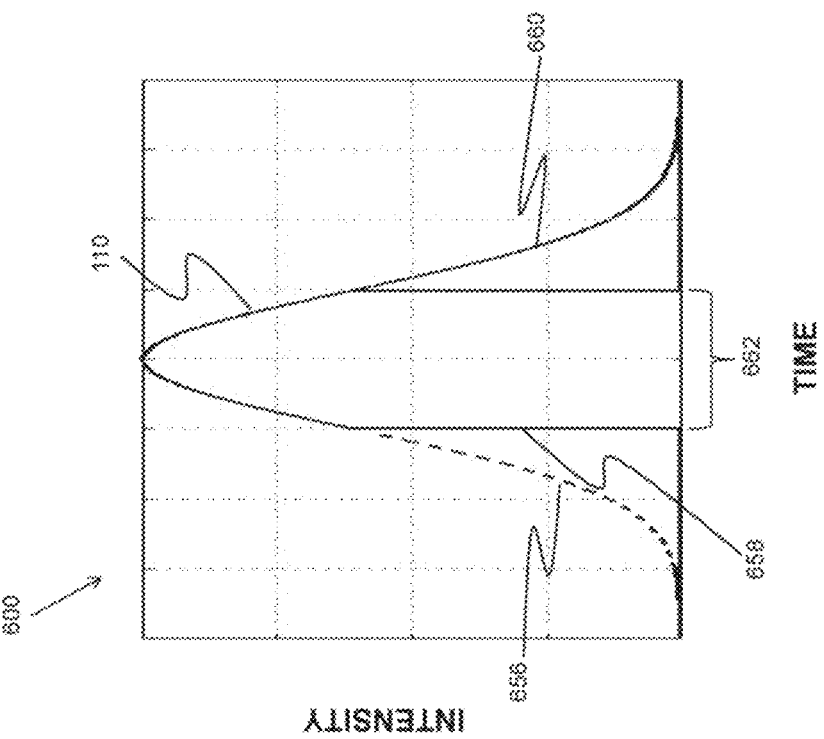
FIG. 6 depicts a Gaussian shaped pulse beam generated by the integrated fiber laser front-end as shown in FIG. 1.

FIGS. 5A to 5C depicts some examples of parameters that control generation of arbitrary pulses by the pulse-shaped frontend as shown in FIG. 2. The parameters may include the electrical pulse 153a (see FIG. 5A), an optical pulse ramp or a rise time (see FIGS. 5B, 5C).

Figure 4A:
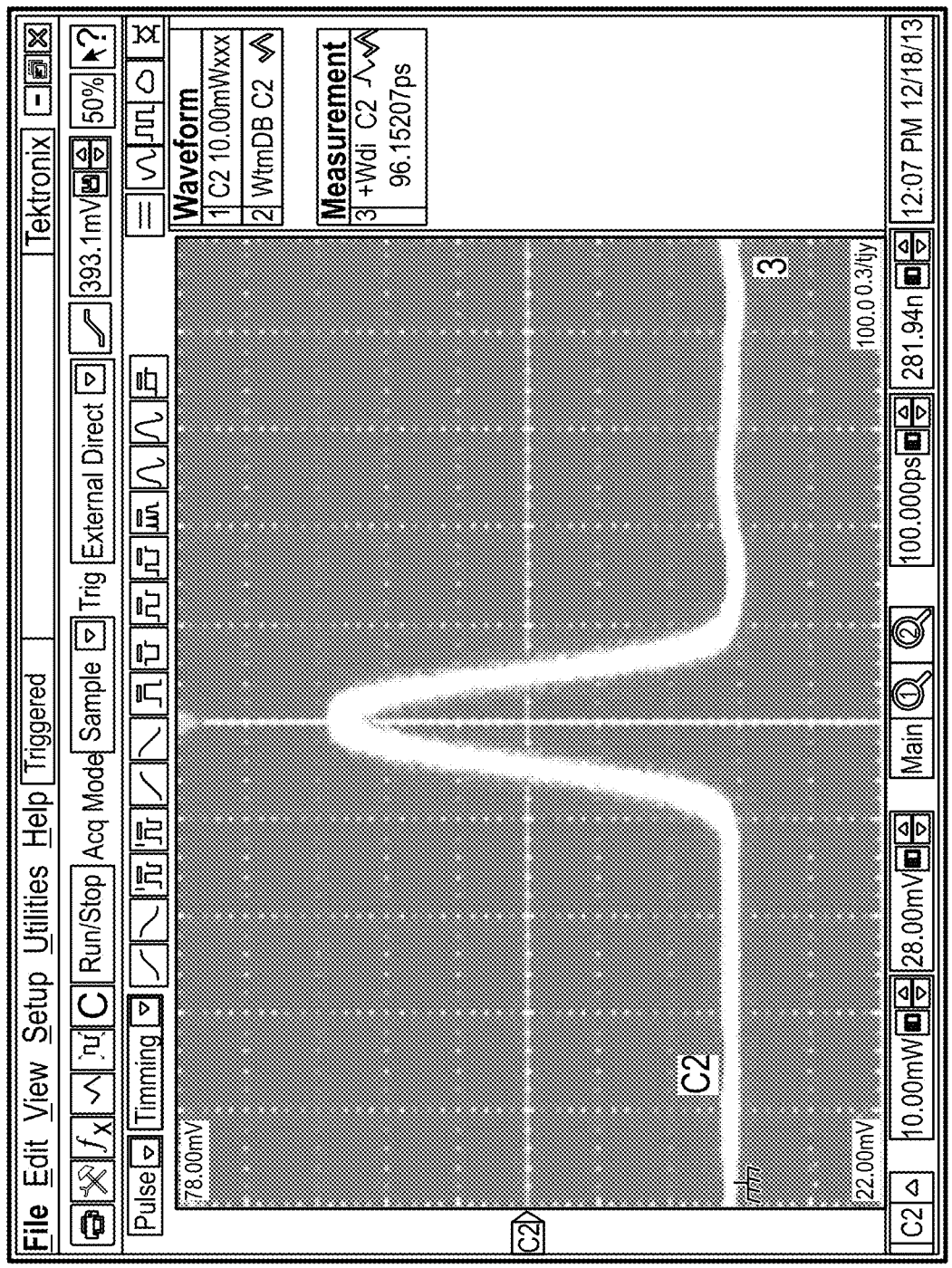
FIGS. 4A to 4D illustrate some examples of arbitrary shaped pulses and pulse widths generated by the Modbox as shown in FIG. 3B.
Figure 4B:
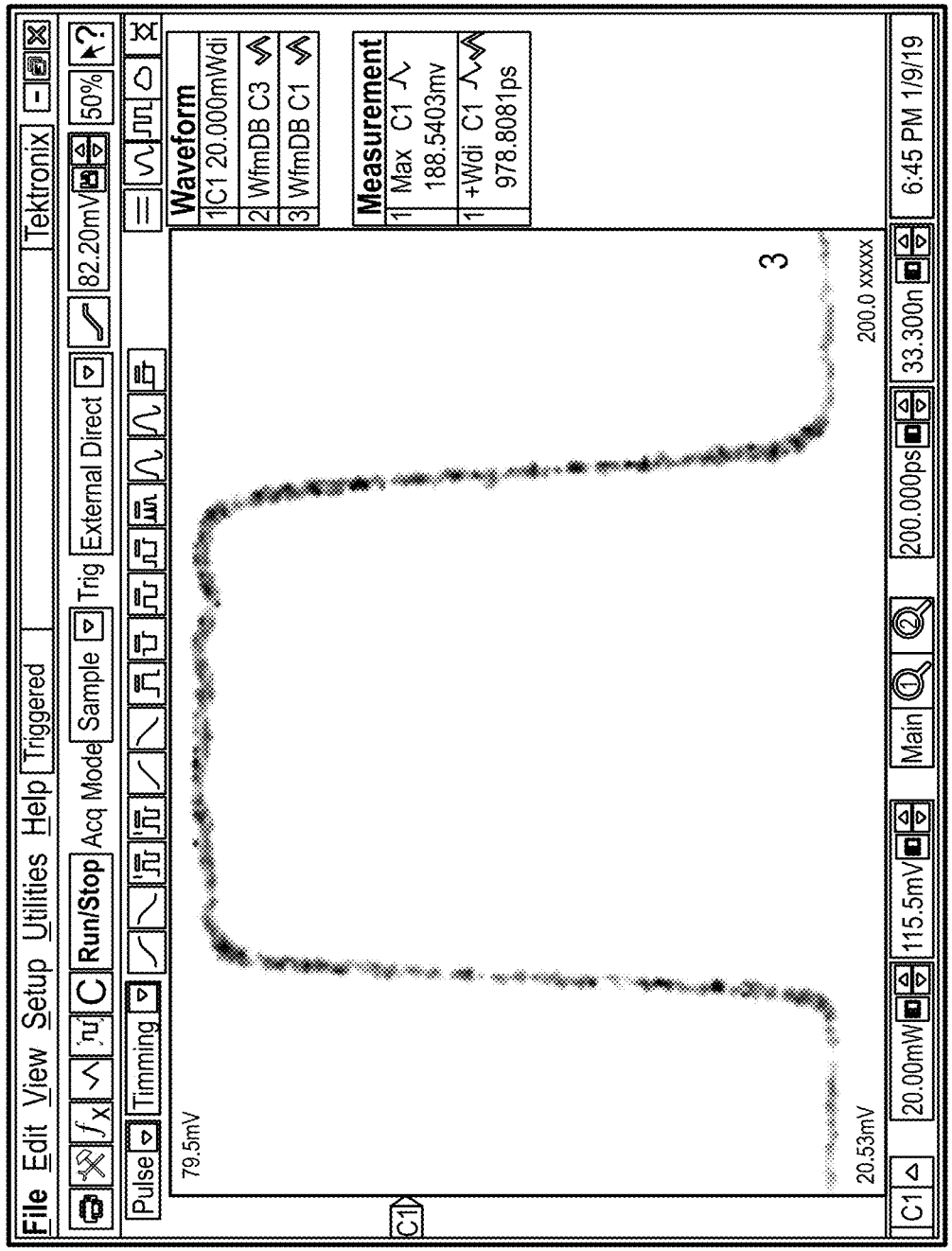
Figure 4C:
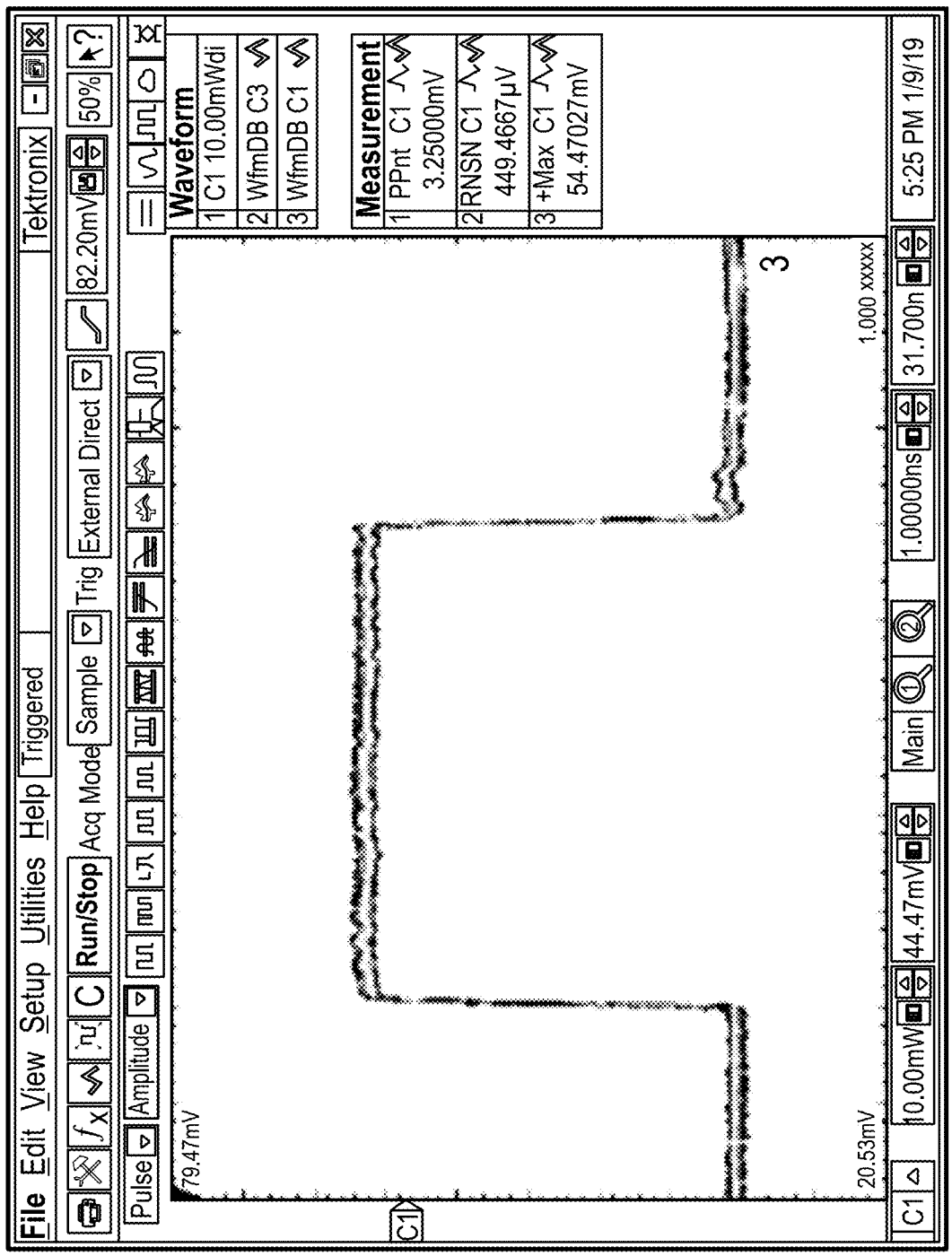
Figure 4D:
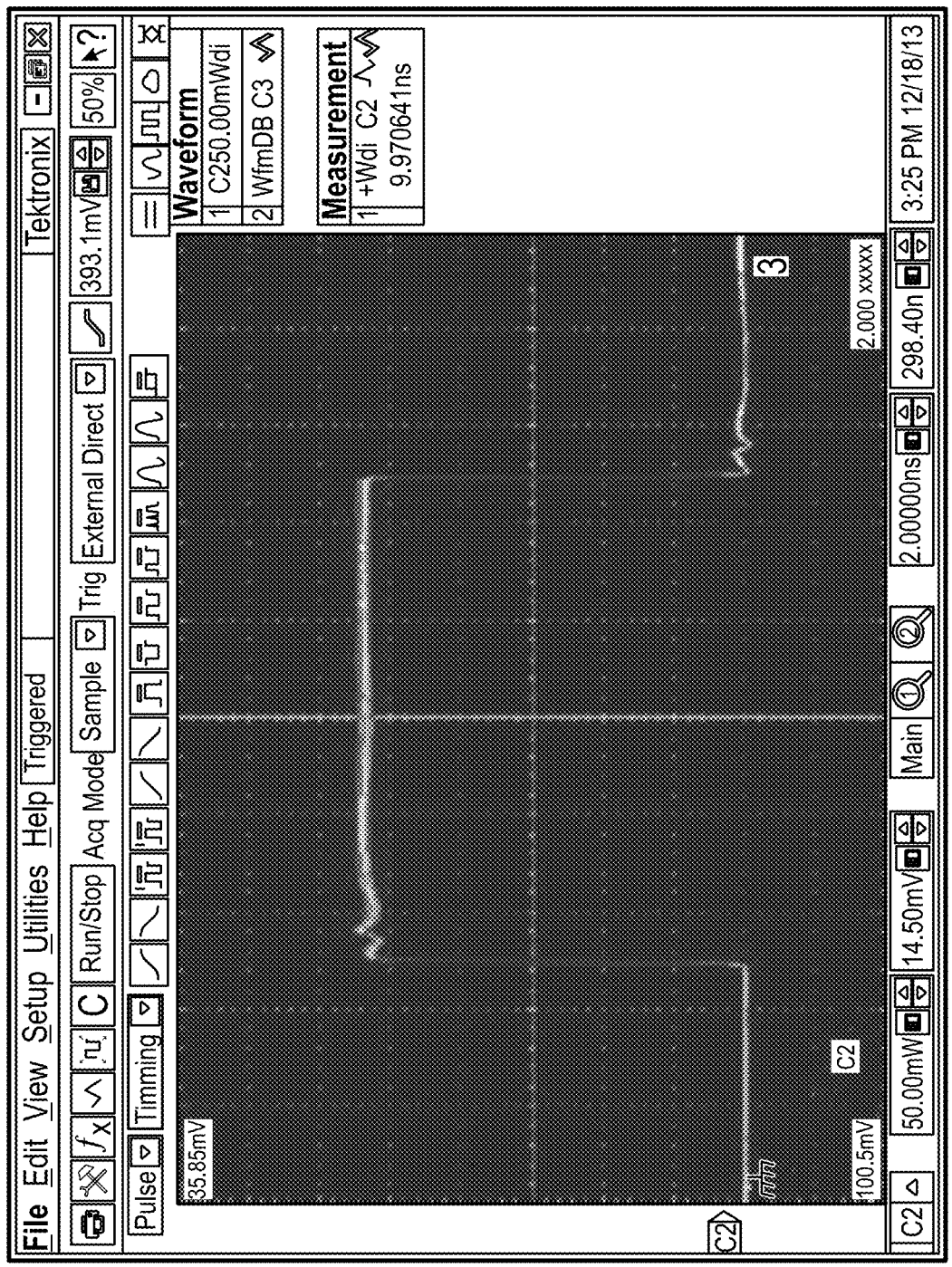

FIG. 4A depicts a Gaussian shaped pulse beam 108 generated by the integrated fiber laser front-end 102 as shown in FIG. 1. In this example, the pre-amplified first pulsed laser beam 108 may have the predefined beam characteristics corresponding to the a Gaussian shaped pulse beam 108 according to the setting selection of the controller 140.

In a case when the Gaussian shaped first pulsed laser beam 108 may have a slower rise time of more than 15 ns, a rising edge of the Gaussian shaped first pulsed laser beam 108 may be pulse sliced to a by the Pockels cell 104 containing the crystal material dideuterium phosphate (KD*P) to output the modified first beam 110 having the modified pulse width 662 (PW2 see FIG. 6) of less than 12 nanosecond (typically 5-12 nanoseconds) with the second temporal profile.

Figure 7:
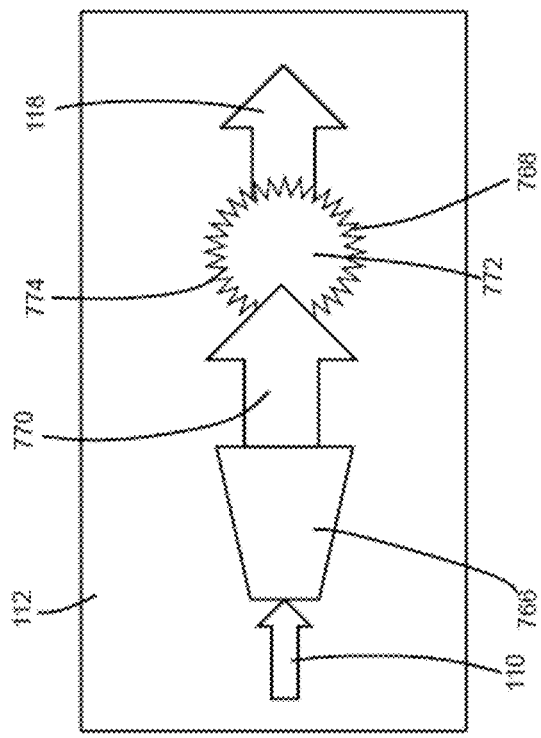
FIG. 7 is a schematic diagram of a Gaussian shaped pulse laser beam passing through an optical filter.

FIG. 7 is a schematic diagram of the Gaussian shaped first pulse laser beam 110 passing through an optical filter. More specifically, the Gaussian shaped first pulsed beam 110 may have a first diameter d1 and wings sections (878). The optical filter 112 may include: a beam expander 766 configured to expand the Gaussian shaped first pulsed beam 110 to a diameter d2, which is greater than the first diameter d1; and an apodizer 768 configured to receive an expanded first beam or an expanded modified first beam 770 from the beam expander 766, to remove the wing portions 878 to output a second beam 118 having a flat top shaped 881 without the wing portions 878.

By increasing the diameter d1 of the Gaussian shaped first pulsed beam 110 with the beam expander 766, the expanded modified first beam 770 may overfill an aperture 772 on the beam shaping element 768. In one embodiment, the beam shaping element 768 is an apodizer. An apodizer 768 may include an aperture 772 with a grit blasted or serrated edge 774. By expanding the Gaussian shaped first pulsed beam 110 with the beam expander 766 and overfilling the apodizer 768 with the expanded modified first beam 770, wing portions of the expanded modified first beam 770 may be removed to further modify the Gaussian shaped first pulsed beam 110 with the first spatial profile to the second beam 118 having a second spatial profile with a more flat-top, top-hat shaped appearance while the first temporal profile remains substantially unchanged. Other beam shaping devices may be used for beam shaping element 768. In another embodiment, a pi shaper (πshaper®), manufactured by AdlOptica Optical Systems GmbH of Berlin, Germany, is used as the beam shaping element 768 to produce a flat-top (or pi-shaped) second beam 118.

A beam shaping element may be used to create a substantially top-hat shaped, flat-top beam from the beam center portion 876. After removing the wing sections 878, the rounded portion 880 of the substantially top-hat shaped, flat-top beam may continue to flatten, as approximated by the dashed line 881, as the second beam 118 with the flat-top center portion 876 passes through the multi-stage post-amplifier 106.

With reference to FIG. 1, the second beam 118 having a second energy, a second temporal profile, and a second spatial profile may be output from the optical filter 112 and input into the multi-stage post-amplifier 106 for amplification of the second beam 118. The multi-stage post-amplifier 106 may output an output beam 126 which has been post-amplified and modified. In the embodiment which the Gaussian shaped first pulsed beam 110 output from the integrated fiber front-end 102 has a first energy, a first beam diameter d1, a first temporal profile, and a first spatial profile, while the modified and post-amplified output beam 126 output from the multi-stage post-amplifier 106 has an energy greater than the first energy, a beam diameter d2 greater than the first beam diameter d1, a temporal profile different than the first temporal profile, and a spatial profile which is different than the first spatial profile.

Figure 9:
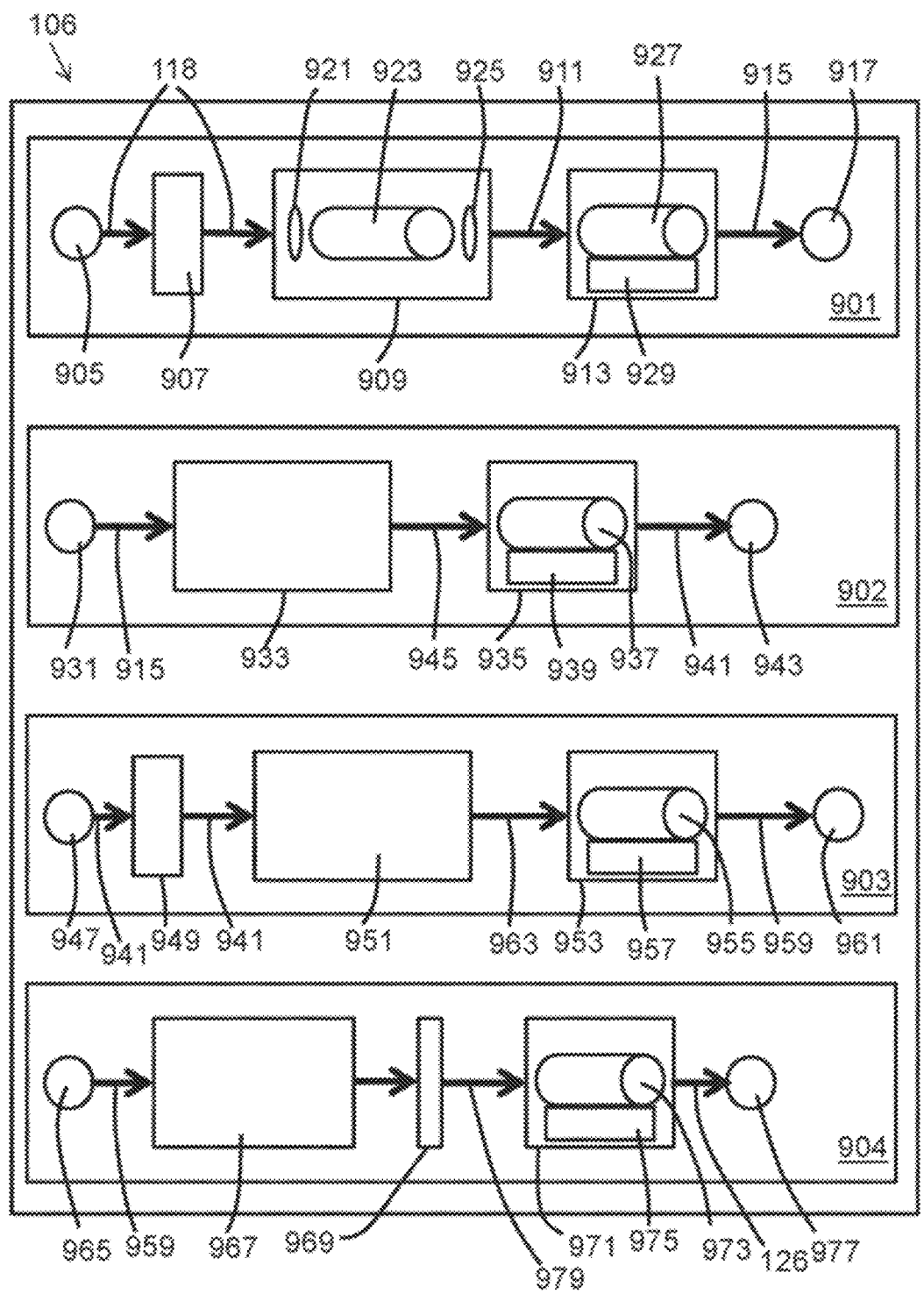
FIG. 9 is a schematic diagram of a multi-stage post-amplifier.

With reference to FIG. 9, an example multi-stage post-amplifier 106 is illustrated. As illustrated in FIG. 9, the multi-stage post-amplifier has four post-amplification stages 901, 902, 903, and 904. As shown here, the second beam 118 may enter the first post-amplifier stage 901, and a modified and post-amplified output beam 126 may be output from the fourth post-amplifier stage 904.

The second beam 118 may be input into the input 905 on the first amplifier stage 901, and passed through the optical isolator 907. From the optical isolator 907, the second beam 118 may pass further through a vacuum relay imaging module (VRIM) 909 that focuses the second beam 118, and then re-collimates the second beam 118 to an increased diameter d3, before outputting a collimated beam 911 to an amplifier module 913. The amplifier module 913 may post-amplify the collimated beam 911 and output a post-amplified third beam 915 to a first amplifier stage output 917.

An optical isolator 907 may function similarly to the optical isolator 114 or 120 described above. The optical isolator 907 may be a Faraday isolator that transmits the second beam 118 in a forward direction of travel while blocking backscattered light and other backward directed energy from the second beam 118. In one embodiment, the optical isolator 907 is used to protect the previously described components of the laser system 100 from backward directed energy from the second beam 118 after the second beam 118 passes through the optical isolator 907. The optical isolator 907 may provide for a passage of the second beam 118 with a beam diameter of up to about 8 mm.

The second beam 118 may pass through the isolator 907 and be input into the vacuum relay imaging module (VRIM) 909. The VRIM 909 may focus and re-collimate the second beam 118, and output the collimated beam 911. The VRIM 909 may include a first lens 921, a vacuum tube 923, and a second lens 925. The second beam 118 enters the VRIM 909 and passes through the first lens 921 which passes the second beam 118 through focus near the center of the inside of the vacuum tube 923. As the second beam 118 exits the vacuum tube 923, the second beam 118 is re-collimated by the second lens 925. The collimated beam 911 is output from the VRIM 909 with a decreased beam intensity and a third beam diameter d3 greater than the second beam diameter d2 of the pulsed laser second beam 118. The VRIM 909 relays the second beam 118 into a larger third diameter d3 collimated beam 911. The vacuum tube 923 is used to prevent the air breakdown of the second beam 118 at the point of focus. The air breakdown of the second beam 118 would result in a loss of beam quality and beam energy.

The VRIM 909 may preserve a spatial profile of the second beam 118, while increasing the size of the second beam 118 to optimally fill the gain medium 927 of the amplifier module 913. Optimally filling the gain medium 927 optimizes the amplification of the collimated beam 911 by the amplifier module 913.

The beam 911 enters into the gain medium 927 of the amplifier module 913. The amplifier module 913 includes the gain medium 927 and a pump source 929. The pump source optically pumps the beam 911 as it passes through the gain medium 927. The gain medium 927 may be a Nd:YLF crystal laser rod pumped by a laser diode array 929. As the beam 911 passes through the rod 927, the beam 911 is post-amplified and is output as an post-amplified third beam 915. In one embodiment, the laser rod 927 is about 5 mm in diameter. In another embodiment, the laser rod 927 is about 4-6 mm in diameter. In another embodiment, the laser rod 927 is about 3-7 mm in diameter. The gain medium 927 may have a fill factor of about 80%—that is, about 80% of the gain medium area will be filled by the beam 911. Generally, a gain medium with a larger fill factor will have a higher gain, and more energy stored within the gain medium may be extracted. In one embodiment, the rod 927 has a fill factor of 85%.

The first amplifier stage 901 with the amplifier module 913 may serve as a small amplifier to post-amplify the energy of a second beam 118 input at the input 905 and output the post-amplified third beam 915 at the output 917. In the given example, the post-amplified beam 915 may have a third energy of about 40 mJ to 100 mJ, a third beam diameter d3 of about 4.5 mm, a third temporal profile, and a third spatial profile.

The post-amplified third beam 915 may be input into an input 931 on the second amplifier stage 902. The second amplifier stage 902 may be similar to the first amplifier stage 901 and include a VRIM 933, and an amplifier module 935 having a gain medium 937, and a pump source 939. A post-amplified beam 941 may be output from the amplifier module 935 to a second amplifier stage output 943.

The VRIM 933 may be similar in operation to the VRIM 909 and include lenses and a vacuum tube to focus the amplified beam 915, re-collimate the third beam 915, and output a collimated beam 945. The VRIM 933 prevents the breakdown of the post-amplified beam 915, and increases a diameter d3 of the post-amplified third beam 915 to increase the fill factor of the collimated beam 945 on the gain medium 937. Lenses of the VRIM 933 may be of a larger diameter than the lenses 921 and 923 in the VRIM 909 (i.e., a beam with a higher energy and larger beam diameter, for example the post-amplified beam 915, may utilize larger diameter lenses), and the lengths of a vacuum tube in the VRIM 933 may be longer than the tube 923 in the VRIM 909. Generally, the lens size for a VRIM and a length of a vacuum tube in a VRIM increase with an increase in the beam energy and beam diameter. The VRIM 933 may relay image the post-amplified beam 915 into the collimated beam 945 with a diameter to provide the gain medium 937 with a fill factor of about 80% to 85%.

The amplifier module 935, similar to the amplifier module 913 described above, may include a gain medium 937 and a pump source 939. The beam 945 may pass through the gain medium 937 as the gain medium 937 is pumped by pump source 939, so as to post-amplify the beam 945, before the beam 945 is output from the amplifier module 935 as the post-amplified fourth beam 941. The gain medium 937 may be a Nd:YLF crystal laser rod pumped by a laser diode array 939. In one embodiment, the laser rod 937 is about 9 mm in diameter. In another embodiment, the laser rod 937 is about 8-10 mm in diameter. In another embodiment, the laser rod 937 is about 7-11 mm in diameter. The second amplifier stage 902 with the amplifier module 935 may serve as a small amplifier to post-amplify the energy of a third beam 915 input at the input 931 and output the post-amplified fourth beam 941 at the output 943. In the given example, the post-amplified fourth beam 941 may have a fourth energy of about 1 J, a fourth beam diameter d4 of about 8.1 mm, a fourth temporal profile, and a fourth spatial profile.

As shown in FIG. 9, the amplifier stages 901 and 902 may operate in the small signal gain regime, which may further sharpen the leading edge of the temporal profile of a beam through gain sharpening. The pulse width of the beam may also narrow as the beam passes through these amplifier stages.

The post-amplified fourth beam 941 may be input into an input 947 on the third amplifier stage 903. The third amplifier stage 903 may be similar to the previous amplifier stages 901 and 902 and include an optical isolator 949, a VRIM 951, and amplifier module 953 having a gain medium 955, and a pump source 957. A post-amplified fifth beam 959 may be output from the amplifier module 953 to a third amplifier stage output 961.

The optical isolator 949 may be similar in operation to the optical isolator 907 described above. In one embodiment, the optical isolator 949 is configured to provide passage for the post-amplified fourth beam 941 having a diameter up to about 12 mm.

The VRIM 951 may be similar in operation to the VRIMs 909 and 933 described above, including lenses and a vacuum tube to focus the post-amplified fourth beam 941, re-collimate the post-amplified fourth beam 941, and output a collimated beam 963. The VRIM 951 prevents a breakdown of the post-amplified fourth beam 941 after the post-amplified fourth beam 941 is focused, and re-collimates the fourth beam 941 to increase the diameter of the post-amplified fourth beam 941 to increase the fill factor of the collimated beam 963 on the gain medium 955. The lenses of the VRIM 951 may be of a larger diameter than the lenses in the VRIMs 909 and 933, and the length of the vacuum tube in VRIM 951 may be longer than the vacuum tubes in the VRIMs 909 and 933. The VRIM 951 may relay image the post-amplified fourth beam 941 into the collimated beam 963 with a diameter to provide the gain medium 955 with a fill factor of about 80% to 85%.

The amplifier module 953, similar to the amplifier modules 913 and 935 described above, may include a gain medium 955 and a pump source 957. The collimated beam 963 may pass through the gain medium 955 as the gain medium 955 is pumped by the pump source 957 to post-amplify the beam 963, before the beam 963 is output from the amplifier module 953 as the post-amplified beam 959. The gain medium 955 may be a Nd:YLF crystal laser rod pumped by a laser diode array 957. In one embodiment, the laser rod 955 is about 15 mm in diameter. In another embodiment, the laser rod 955 is about 14-18 mm in diameter. In another embodiment, the laser rod 955 is about 12-18 mm in diameter. The third amplifier stage 903 with the amplifier module 953 may serve as a small amplifier to post-amplify an energy of a beam input at the input 947 and output the fifth post-amplified beam 959 at the output 961. In the given example, the post-amplified beam 959 may have a fifth energy of about 4.3 J, a fifth beam diameter d5 of about 13.5 mm, a fifth temporal profile, and a fifth spatial profile.

The post-amplified fifth beam 959 may be input into an input 965 on the fourth amplifier stage 904. The fourth amplifier stage 904 may be similar to the previous amplifier stages 901, 902, and 903, and include a VRIM 967, a waveplate 969, and an amplifier module 971 having a gain medium 973 and a pump source 975. An post-amplified output beam 126 may be output from the amplifier module 971 to a fourth amplifier stage output 977.

The VRIM 967 may be similar in operation to the VRIMs 909, 933, and 951 described above, including lenses and a vacuum tube to focus the post-amplified fifth beam 959, re-collimate the post-amplified fifth beam 959, and output a collimated beam 979. The VRIM 967 prevents the breakdown of the post-amplified fifth beam 959, and re-collimates the post-amplified fifth beam 959 to increase the diameter of the post-amplified fifth beam 959, so as to increase the fill factor of the output beam 979 on the gain medium 973. The lenses of the VRIM 967 may be of a larger diameter than lenses in the VRIMs 909, 933, and 951, and the length of the vacuum tube in VRIM 967 may be longer than the tubes in the VRIMs 909, 933, and 951. The VRIM 967 may relay image the post-amplified fifth beam 959 into the collimated beam 979 with a diameter to provide the gain medium 973 with a fill factor of about 80% to 85%.

The amplifier module 971, similar to the amplifier modules 913, 935, and 953 described above, may include a gain medium 973 and a pump source 975. The collimated beam 979 may pass through the gain medium 973 as the gain medium 973 is pumped by the pump source 975 to post-amplify the beam 979, which is output from the amplifier module 971 as the post-amplified output beam 126. The gain medium 973 may be a Nd:YLF crystal laser rod pumped by a laser diode array 975. In one embodiment, the laser rod 973 is about 25 mm in diameter. The fourth amplifier stage 904 with the amplifier module 971 may serve as an amplifier to post-amplify an energy of a beam input at the input 965 and output the post-amplified output beam 126 at the output 977. In one embodiment, the fourth amplifier stage 904 includes one amplifier module 971. In another embodiment, the fourth amplifier stage 904 includes one or more amplifier modules 971. In the given example, the post-amplified output beam 126 may have a sixth energy of about 7 J to 13 J, a sixth beam diameter d6 of about 20 mm to 25 mm, a sixth temporal profile, and a sixth spatial profile. The post-amplified output beam 126 output from the multi-staged post-amplifier 106 may be a modified and post-amplified beam.

Characteristics of a beam moving through the amplifier 106 may change due to the amplification of the beam. For example, as a beam is post-amplified, the beam diameter may be increased by the optical elements in the multi-staged post-amplifier 106 to more efficiently fill each gain medium (e.g., laser rod), which may provide the most optimally post-amplified laser output from the gain media, while also fully utilizing the capabilities of certain components within the multi-staged post-amplifier 106.

The beam diameter may increase as a beam passes through the multi-staged post-amplifier 106 so as to match a gain medium size (e.g., rod diameter), for example, the rods 927, 937, 955, and 973 used in the respective amplifier stages 901, 902, 903, and 904. As the beam energy is increased throughout the multi-staged post-amplifier 106, a risk of damage to the optical components within the multi-staged post-amplifier 106 increases if the beam diameter remains too small. The power density on the gain media may be kept below the damage thresholds by increasing the beam size as the beam energy increases.

Other characteristics of beam moving through the multi-staged post-amplifier 106 may change due to the amplification of the beam. For example, the leading edge of a beam's temporal profile may be sharpened as a beam is post-amplified.

As shown in FIG. 1, the controller 104 may be used to control the timing of amplifier modules 913, 935, 953, and 971, as shown in FIG. 9. Specifically, the controller 104 may control when the pump source in an amplifier module pumps the gain medium in the amplifier module to optimize the amplification of a beam passing through the gain medium. In this way, the post-amplification of a beam passing through an amplifier module may be controlled.

With reference to FIG. 1, an optical isolator 120 may be used after the output beam 126 is output from the multi-staged post-amplifier 106 to prevent the output beam 126 from interacting with the prior optical components of the laser system 100 once the output beam 126 passes through the optical isolator 120. For example, once the output beam 126 passes through the optical isolator 120, the optical isolator 120 prevents backscattered light from the output beam 126 from interacting with any of the prior optical components from the integrated fiber laser front-end 102 to the multi-staged post-amplifier 106 in the system 100. In one embodiment, the optical isolator 120 is a Faraday isolator and may allow the passage of the beam 126 having a diameter up to about 35 mm.

Additional elements may be used with the laser system 100 to deliver a modified and post-amplified laser output beam 126 to the target part 101 for laser shock peening (LSP) applications. The output beam 126 may pass through the optical isolator 120 and to the beam delivery device 122 for delivery to a target part 101 alone, or a target part 101 contained in the peening cell 124.

Figure 10:
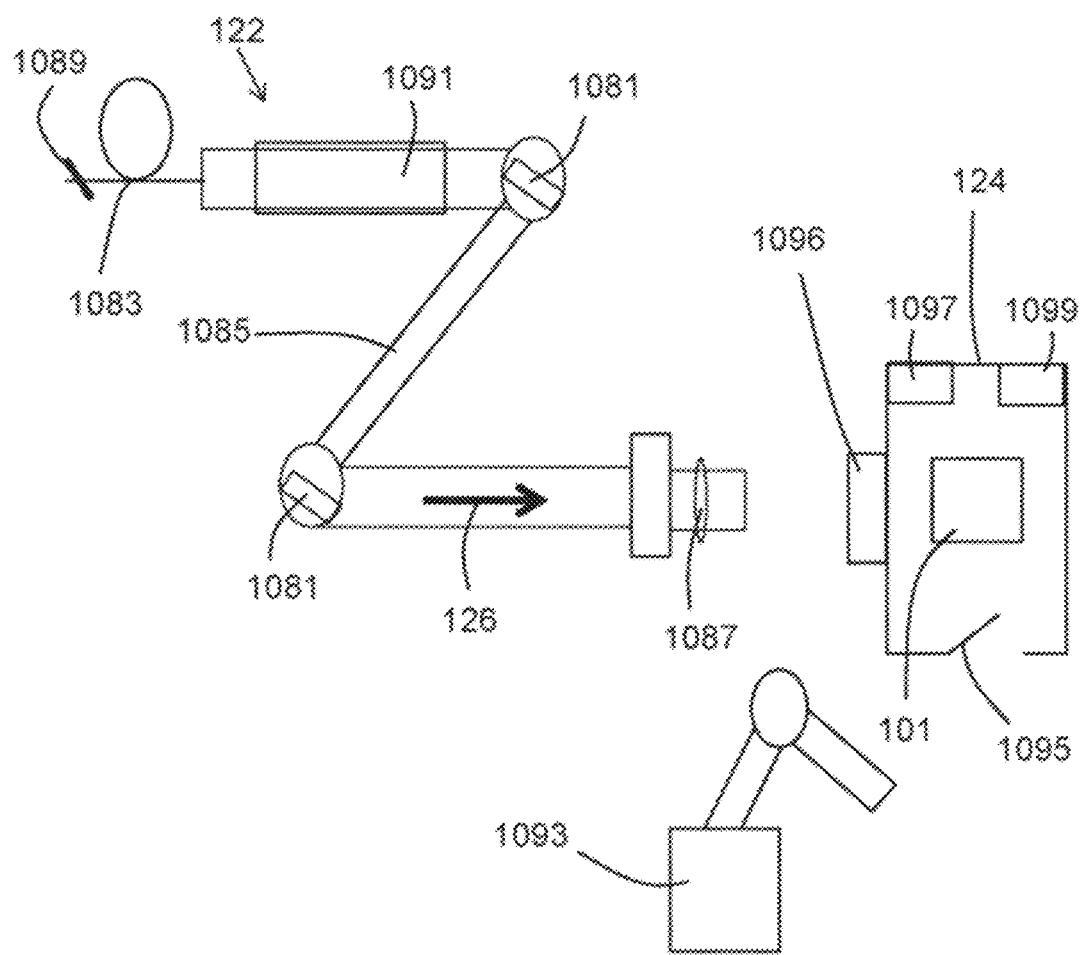
FIG. 10 is a schematic diagram of an example beam delivery device for laser peening.

As illustrated in FIG. 10, the laser beam delivery device 122 may include one or more mirrors 1081, one or more optical cables 1083, and a multi-axis articulating arm 1085. A laser beam delivery device 122 may include focusing optics 1087 to focus a larger sized output beam 126 into a smaller spot size of about 2-3 mm for use in LSP applications. In one embodiment, a focusing optic 1087 of laser beam delivery device 122 focuses and adjusts a spot size of the output beam 126 to between about 3 mm and 8 mm. The laser beam delivery device 122 may also include additional safety features such as a shutter 1089 to block the output beam 126 from entering the laser beam delivery device 122, unless the delivery device 122 is positioned to deliver the beam 126 to the target part 101 or peening cell 124. Additional VRIM assemblies 1091 may be used with the laser beam delivery device 122 to maintain near filed values and measurements of the modified and post-amplified output beam 126 output from the amplifier 106. In one embodiment, a VRIM 1091 is used to relay image the beam 126 to the target part 101.

The laser peening cell 124 may contain the target part 101 to be laser shock peened. A robotic handling 1093 system may be adapted to manipulate the laser beam delivery device 122 to change the position of the laser beam delivery device, and thus the position of the output beam 126 output from the delivery device 122 to the target part 101. A robotic handling 1093 system may also be used to introduce parts to and from the laser peening cell 124. The laser peening cell 124 may provide a light-tight environment to confine dangerous laser light from the output beam 126 within the laser peening cell 124. The laser peening cell 124 may be equipped with additional options like lighting, an air filtration system, and evacuation system for removing effluent and debris produced during LSP processing, and an interface 1095 (i.e., entry/exit) for a robot 1093 to move parts into and out of the laser peening cell 124, as well as other safety systems. In one embodiment, the laser peening cell 124 may be sized at dimensions of about 4.5 m×4.5 m×3.0 m (height) to allow a robot 1093 to manipulate larger target parts therein. A laser peening cell 124 may include a target isolation system 1096, for example, an optical isolator, to prevent laser energy backscattered from the target part 101 from entering into the delivery device 122 or other optical elements of the apparatus. In one embodiment, the laser peening cell 124 may include an opaque overlay applicator 1097 to apply an opaque overlay to the target part 101, and a transparent overlay applicator 1099 to apply a transparent overlay to the target part 101. An opaque overlay and a transparent overlay may be applied to the target part 101 such that the post-amplified and modified beam 126 contacts the opaque and transparent overlays on the target part 101 during the LSP process.

In one embodiment, the near-field values of the modified and post-amplified beam 126 include an energy of about 7 to 13 J, a pulse width of up to about 16 ns, an average power of 200 W, and a spot size of at least 3 mm. In this embodiment, the modified and post-amplified beam 126 with these parameters is produced by the laser system 100 at a repetition rate of 20 Hz.

In another embodiment, the near-field values of the modified and post-amplified beam 126 include an energy of about 5 J to about 10 J, and average power of about 5 W to about 200 W, a beam uniformity of less than about 0.2 (20%), and a beam focused to a spot size of about 3 mm to about 8 mm. In this embodiment, the oscillator 102 of the laser system 100 may produce a beam with a beam quality of less than about 1.3 M2 out of the oscillator, and a beam having these parameters and the initial beam quality may be produced with a variable repetition rate between about 1 Hz and 20 Hz, for example, optionally variable "on the fly," depending on a surface of the target part 101.

In another embodiment, a working distance of about 5-10 m between the final focusing optic 1087 and the target part 101 is possible. A large working distance may adequately distance the optical components of the laser system 100 from debris and effluent produced during the LSP processes.

Embodiments described herein may use robotic controls, control systems, and instruction sets stored on a computer readable medium, that when executed, may perform exampled methods described herein. For example, a robot may be used for manipulating a target part and directing a pulsed laser beam to different locations on a target part. A robot may be used to move target parts in and out of a laser peening cell for LSP. A robot may move parts in batches for efficient LSP processing. Robots may interface with a control system to manipulate parts for LSP processes—that is, a robot may control positioning of a part such that a part may be positioned to receive both a transparent overlay, and a laser pulse for LSP. A robot arm may reposition the same part for subsequent LSP targets on the part. In one embodiment, a robot repositions a part for subsequent LSP targets at a rate of about 20 Hz. In another embodiment, a robot has a position repeatability accuracy of less than about 0.2 mm. Additionally, a robot may be used to interact with a tool or sensor to generate feedback for a system adjustment or calibration. As shown in FIG. 10, a robot such as a robotic arm 1093 may be equipped with the components of the beam delivery device 122, such that the robot 1093 and the beam delivery device 122 may be repositioned relative to a stationary part 101, to deliver a laser pulse to the target part 101 for laser shock peening. In this way, a robot may either control the position of the target part 101 relative to the output beam 126, or control the position of the output beam 126 relative to the target part 101.

An apparatus for use in LSP processes may interface with one or more controllers for controlling functions of the apparatus. Controllers may either automatically make calibrations or adjustments, or there may be a user interface for a user to interface with the control of the apparatus. For automatic control, various sensors may be employed to collect various beam parameters as beams progress through the apparatus. Sensor readings may either be collected in real time, or collected at intervals and used as feedback for apparatus control. For example, temperature measurements may be taken within the apparatus at regular intervals to ensure that the apparatus is working within specified temperature ranges. A pulse energy, pulse width, and spatial profile of one or more pulses may be measured and monitored, and when measured values fall outside of a user-selected range, a control system may adjust components of the apparatus so that measured values may fall within a user-selected range.

Data related to laser beam parameters may be taken from inside the apparatus, and from a beam delivery path (e.g. as a fraction reflection from an optical component or leakage of energy through a mirror). Data may be taken periodically and cross-calibrated to target data to ensure that LSP process conditions are within user-selected tolerances.

Beam position and spot sized may be determined with a camera positioned in the beam path with very tight tolerances. A camera may be used to capture a beam image, and parameters extracted from a beam image may be compared with ideal parameters. For example, if a beam position is not centered as indicated by an ideal position parameter, a mirror may be automatically adjusted to move a beam closer to the position defined by the ideal parameters. Adjusting a moving a beam may be done in small increments and it may take several measurements and adjustments until a beam is positioned as defined by ideal position parameters. A camera may also be used to measure a spot area and spot size. A controller may automatically adjust a lens to adjust a target lens to set a spot size.

While not exhaustive or limiting, a control system used with an apparatus for use in LSP processes may be used to/for: configure and monitor an eDrive/oscillator (e.g. timing, pump current); configure and monitor timing generator; control and monitor laser safety; control and monitor laser output; control and monitor laser temperature (e.g. enclosure temperature, cooling water temperature, etc.); control output energy via adjustments to laser-head timings; control of overlay application; control and monitoring of final focusing lens; control and monitoring of final turning mirror; integration with an outside control system such as a robot; to store the configurations of components in the apparatus; store data collected by the apparatus for later processing; and to control access to the apparatus (e.g., limit apparatus access to authorized users).

While not exhaustive or limiting, sensor components of a control system used with an apparatus for LSP processes may sense and monitor: pulse width, pulse energy, a beam spatial profile, diode voltage, pump current, enclosure temperature, cooling water temperature, laser safety systems, and the health of the apparatus.

A control system, as described herein, may be used to automatically adjust: laser head timings; final focusing-lens position; final tuning-mirror position; overlay application timing; cooling system operation; and data collection. A control system may automatically adjust the energy of an output laser beam. A control system may automatically adjust diode voltage. Diode current may be controlled automatically by an eDrive.

The method may further include repeatedly adjusting by an open loop or by a feedback loop mechanism, the parameters of the laser by adjusting the final focusing lens, adjusting the position of a mirror in a laser beam delivery device, and adjusting a pulse slicer, and re-measuring the spot size, the beam position, and the pulse width until the spot size, the beam position, and the pulse width are within a tolerance of the user-defined spot size, beam position, and pulse width.

In an implementation (see FIG. 10), the output beam 126 from the multi-stage post amplifier 106 may pass through another optical isolator 120 to protect reflection to the multi-stage post amplifier 106 with an output beam 126*a* substantially identical to the output beam 126, is delivered to a beam delivery device 122 which may have near field values and measurements. The laser beam delivery device 122 may include a vacuum relay imaging module (VRIM) 1091 configured to maintain the near field values and the measurements of the output beam 126*a* and to deliver the output beam 126*a* to the target part 101. The output beam 126*a* may be delivered to the target 124 through optical waveguides and reflectors to perform high power laser shock peening operations on a metallic surface. Alternately, the beam delivery system 122 may be replaced with a single optical fiber or a bundle of optical fibers to deliver lower power pulsed laser beam for laser bond inspection operations on composite structures.

The laser system 100 may include a feedback mechanism by monitoring the predefined beam characteristics (such as beam frequency, pulse modulation frequency, pulse widths, energy level, etc.) through a sampled signal 126*b* to ensure output beam consistency from pulse to pulse. In an implementation, a beam detector 130 (including a photodetector and a high speed oscilloscope 131) may be coupled to the beam delivery device 122 disposed after the multi-stage post-amplifier 106 for monitoring the sampled signal 126*b* on one or a combination of: beam pulse shape, beam pulse width, beam diameter, and beam energy level.

The beam detector 130 may generate an error signal 128 from sampling signal 126*b* to be sent back as a feedback signal to the controller 140. If a magnitude of the error signal 128 exceeds a defined error range, the error signal 128 may cause the controller 140 to perform one or a combination of the following: output a correction electrical pulse signal 153*a* from the arbitrary wave RF generator 153 and a correction DC bias voltage 154*a* from the automatic modulator bias control (MBC) circuitry to the temporal pulse shaper 152 to counter the pulse width error signal until the pulse width (PW1) stays within the defined tolerance according to the selection setting; and configure one or both of the multi-stage pre-amplifier 155 and the multi-stage post-amplifier 106 with a correction gain signal 146 to adjust one or a combination of the beam energy amplifications and the beam profile modifications to stay within a defined output energy level and a defined beam profile for laser shock peening (LSP) and for laser bond inspection (LBI).

In implementation, the laser system 100 may be compact, lightweight, flexible enough to be configured to perform both LSP and LBI operations without changing laser sources or any of the components already in the laser system 100. The LBI application may interrogate a strength of bonded joints (i.e., an interface or a junction bonded between two different parts or different material layers) in a non-destructive fashion. LBI may also detect the presence of weak bonded regions in adhesive bonds between different materials layers that can lead to bond failure.

Figure 11A:
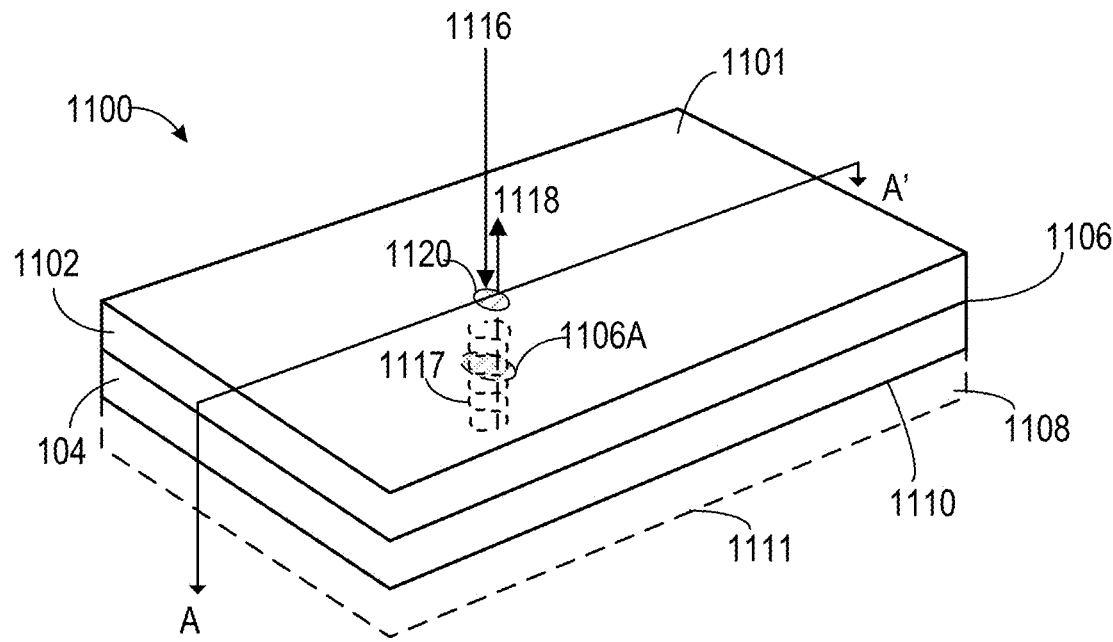
FIG. 11A illustrates an example of applying a pulsed laser beam to interrogate a bonding region in a composite structure in a laser bond inspection (LBI).

FIG. 11A illustrates an example of applying a pulsed laser beam to interrogate a bonding region in a composite structure in a laser bond inspection (LBI). The composite structure 1100 may be formed by at least two separate layers (1102, 1104) bonded together by an adhesive at a bond interface 1106. For example, the first layer 1102 and the second layer 1104 may each be composite layers of a same composite material, or may be composite layers of different composite materials. Alternately, the first layer 1102 and the second layer 1104 may each be layers of non-composite materials, or a combination of a layer of composite material and a layer of non-composite material. Examples of composite materials may comprise any one of: carbon-fiber-reinforced-polymer (CFRP), epoxy graphite fiber or any materials which are of composite nature. Examples of non-composite materials may comprise anyone of: radio frequency (RF) wave absorptive material, thermal protective coating, a dielectric material, metal, alloys, metallic coated films, or any materials which are of non-composite nature. Yet in another example, the composite structure 1100 may be formed by three separate layer (1102, 1104, 1108) having respective bond interfaces (1106, 1110).

Referring to FIG. 11A, a pulsed laser beam 1116 from the laser system 100 may form a beam size region 1120 directed to a top surface 1101 of the composite structure 1100 to interrogate an integrity of a bonding region 1106A having similar beam size region 1120 at the bond interface 1106. Although not shown in FIG. 11A for clarity sake (but shown in FIG. 1B), it is customary in LBI that the top surface 1101 of at least the beam size region 1120 may be masked with an adhesive tape 1112 (preferably black color maximum light absorption), upon which water 1114 may be injected through a nozzle (not shown) which is proximal to an inspection head while pulsed laser beams 1116 are applied through a layer of water 1114 onto a surface of the tape 1112.

Figure 11B:
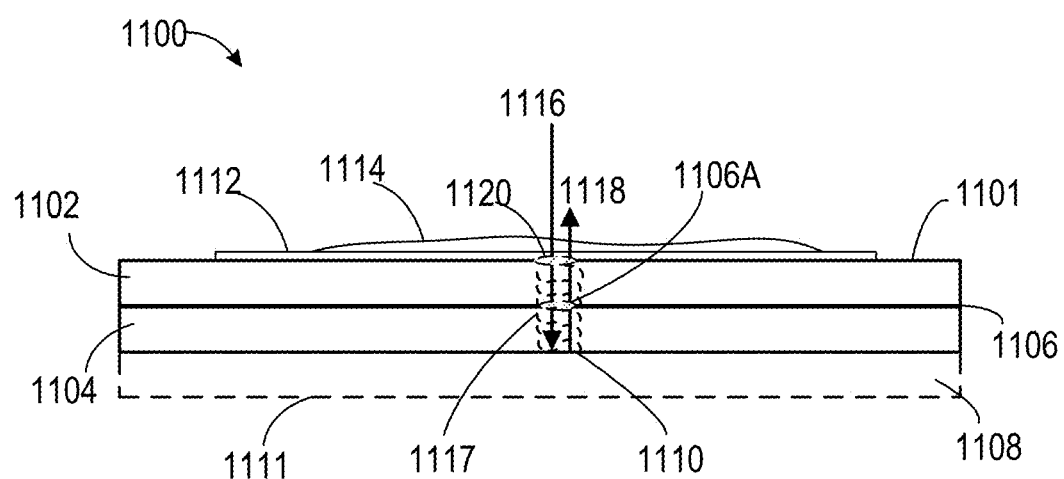
FIG. 11B illustrates a sectional view A-A' of the interrogation of the bonding region in the composite structure, as shown in FIG. 11A.

FIG. 11B illustrates a sectional view A-A' of the interrogation of the bonding region 1106A in the composite structure 1100, as shown in FIG. 11A. Pulsed laser beam 1116 may travel through the water 1114 which on one hand being transparent to the pulsed laser beam 1116, yet the water 1114 on the other hand may function as a tamp to contain and to apply hydrostatic pressure to an energy path of the to the beam size region 1120, in order that the pulsed laser beam 1116 heats up and partially evaporates the material of adhesive tape 1112 at the beam size region 1120 to trigger an explosion of plasma to generate a compressive acoustic shock wave 1117, which propagates through the composite materials of the first layer 1102, the bonding region 1106A and through the composite materials of the second layer 1104 until reaching a back free surface 1110 (i.e., terminal surface of the composite structure 1100) of the second layer 1104 (last layer) which bounces back an acoustic wave as a reflected response 1118 to travel in an opposite direction through the second layer 1104, the interface 1106 and the first layer 1102 which emerges the surface 1101 to be detected by an electromagnetic acoustic transducer (EMAT) sensor for evaluation of the integrity of the bonding region 1106A at the interface 1106.

For a composite structure 1100 having more than two layers (such as having a third layer 1108 or more), the LBI method in likewise interrogate the bond integrity of all the intervening interfaces (i.e., 1106, 1110) between the first layer 1102 and the last layer 1108.

Although water 1114 is described as a preferred transparent medium (for minimal cleanup effort) to the laser beam may be injected onto the surface of the adhesive tape 1112, other transparent liquids such as mineral oils or liquids transparent with sufficiently high specific gravity may also be used.

It should be mentioned that different composite materials with different thicknesses and different adhesives may exhibit a wide range of response in LBI, a baseline calibration test is therefore carried out and stored into a database for reference prior to conducting an actual interrogation of the bonding region 1106A. A baseline calibration may follow a low-high-low energy level calibration sequence on a representative composite sample part to establish an upper limit of energy level that breaks the bonding interface. For example, a representative composite sample part may initially be interrogated by the pulsed laser beam 1116 at an initial low energy level of a defined energy per pulse over a defined pulse width for a defined number of pulses.

The energy level of the pulsed laser beam 1116 may be adjusted higher and higher through raising one or a combination of an intensity and a pulse width. The reflected response is monitored by the EMAT sensor in the inspection head which is displayed as a trace on a scope to record the reflected response until reaching the energy level sufficient to break the adhesive bond to establish an energy threshold as shown on the trace output by the EMAT sensor. Afterwards, a low energy level may be resumed to compare the prior traces at a low energy level. A broken adhesive bond at the interface may show a difference on the reflected trace on the EMAT sensor. Once the energy level of a bond breakdown threshold is identified, an actual composite structure 1100 may be tested at an energy level at a certain percentages below the threshold energy (such as at 50% of the threshold) to allow a safety margin before reaching a destructive energy level while ensuring bond integrity is sufficient.

Figure 12:
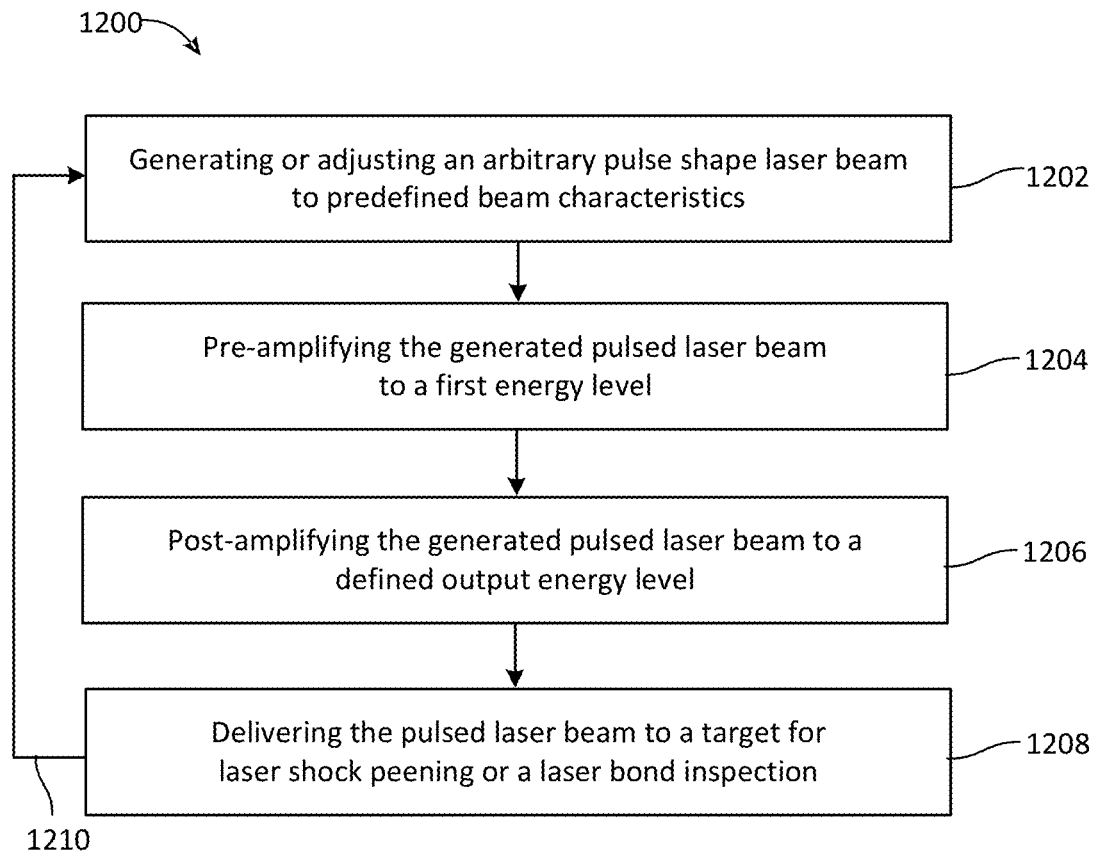
FIG. 12 is a flow diagram of pulsed laser beam generation and adjustment.

FIG. 12 is a flow diagram of pulsed laser beam generation and adjustment method 1200 for laser shock peening or laser bond inspection on a target part by the laser system 100. In step 1202, generating or adjusting an arbitrary pulse shape laser beam to predefined beam characteristics according to a user defined selection setting. The generation of the first pulsed laser beam 102 with the predefined beam characteristics may be under a control of the controller 140. In an example, the controller 140 may be a universal controller having at least a processor (PROC 148) which executes codes of an algorithm stored in a memory (MEM 147) to trigger the electrical pulse 153a from the arbitrary wave RF generator 153 and the DC bias voltage 154a from the automatic modulator bias control (MBC) circuitry, to modulate the CW laser beam 151a to output the first pulsed laser beam 152a with the pulse width PW1 according to the pulse width setting selection.

In steps 1204 and 1206, the energy level of the output beam 126a may be adjusted through configuring one or both of the multi-stage pre-amplifier 155 and the multi-stage post-amplifier 106 with a correction gain signal 146 to adjust one or a combination of the beam energy amplifications and the beam profile modifications to stay within a defined output energy level and a defined beam profile for laser shock peening (LSP) and for laser bond inspection (LBI) in step 1208.

In step 1210, the controller 140 may also receive a feedback signal 128 generated from the sampled signal 126b which monitors the beam characteristics of the output beam 126a at the beam delivery 122. The feedback signal 128 may be realized as a correction electrical pulse signal 153a to adjust the arbitrary wave RF generator 153 and the DC bias voltage 154a from the automatic modulator bias control (MBC) circuitry which cause the temporal pulse shaper 152 to modulate the CW laser beam 151a to adjust the pulse shape, the pulse width PW1 and the pulse modulation frequency by an opposite amount to counter the magnitude of the error signal 128 until the first pulsed laser beam yields the setting selection of the controller.

Unless specifically stated to the contrary, the numerical parameters set forth in the specification, including the attached claims, are approximations that may vary depending on the desired properties sought to be obtained according to the example embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail if such detail is not recited in the claims. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and example embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

As used in the specification and the claims, the singular forms "a," "an," and "the" include the plural. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. Finally, where the term "about" is used in conjunction with a number, it is intended to include ±10% of the number. In other words, "about 10" may mean from 9 to 11.

What is claimed is:

1. A laser system, comprises:
an integrated fiber laser front-end, configured to generate and output a pre-amplified first pulsed laser beam having predefined beam characteristics corresponding to a setting selection of a controller, wherein the predefined beam characteristics comprise: a beam frequency, a first energy, a pulse modulation frequency, a first spatial profile including a first beam diameter, and a pulse shape, and a first temporal profile including a pulse width PW1;

an optical filter configured to modify the pre-amplified first pulsed beam to output a second pulsed laser beam having a second spatial profile and a second energy; and a multi-stage post-amplifier configured to output an output beam having the after beam energy post amplifications and beam profile modifications, the multi-stage post-amplifier comprising:

a first stage configured to post-amplify and modify the second pulsed laser beam to output a third pulsed laser beam having a third energy and a third temporal profile; and a second stage configured to post-amplify and modify the third pulsed laser beam to output a fourth pulsed laser beam as the output beam having a fourth energy and a fourth temporal profile, wherein the fourth pulsed laser beam substantially maintains the pulse width setting PW1 within a defined tolerance of the setting selection.

2. The laser system of claim 1, wherein the integrated fiber laser front-end comprises:

an integrated oscillator/pulse shaper, wherein the integrated oscillator/pulse shaper further comprises:

a master oscillator which outputs a monochromatic frequency continuous wave (CW) laser beam at a first output energy level;

a temporal pulse shaper which receives the CW laser beam, in response to an electrical pulse from an arbitrary wave radio frequency (RF) generator and a direct current (DC) bias voltage from an automatic modulator bias control (MBC) circuitry, modulates the CW laser beam to output a first pulsed laser beam with the pulse width PW1 according to the pulse width setting selection of the controller.

3. The laser system of claim 2, wherein the integrated fiber laser front-end comprises:

a multi-stage pre-amplifier, disposed at an output of the integrated oscillator/pulse shaper to amplify the first pulsed laser beam to output the pre-amplified first pulsed laser beam prior to the post-amplification; and a first optical isolator disposed between the output of the integrated oscillator/pulse shaper and the multi-stage pre-amplifier.

4. The laser system of claim 3, comprises a first Faraday rotator (FR1) disposed between the first optical isolator and a first portion of the multi-stage pre-amplifier, wherein the FR1 performs a double pass on the first pulsed laser beam by first rotating the FR1 to allow a forward pass of the first pulsed laser beam to be first pre-amplified by the first portion of the multi-stage pre-amplifier to a first pre-amplified beam, and second rotating the FR1 to allow a reverse pass of a second pre-amplified beam of the first pulsed laser beam, which is after the first pre-amplified beam being reflected by a first mirror and then passing through the first portion of the multi-stage pre-amplifier to be second pre-amplified in a reversed direction to be the second pre-amplified beam.

5. The laser system of claim 4, wherein the second pre-amplified first pulsed beam is received by a first Pockels cell followed by a second isolator, wherein the first Pockels cell operates as a first optical switch to synchronize at an exact time the received second pre-amplified first pulsed laser beam arrives for a subsequent amplification, and the second optical isolator protects the first Pockels cell from damages due to reflection.

6. The laser system of claim 5, comprises a second Faraday rotator (FR2) disposed between the second optical isolator and a second portion of the multi-stage pre-amplifier, wherein the FR2 performs a double pass on the second pre-amplified beam by first rotating the second Faraday rotator (FR2) to allow a forward pass of the second pre-amplified beam to be third pre-amplified by the second portion of the multi-stage pre-amplifier to a third pre-amplified beam, and second rotating the FR2 to allow a reverse pass of a fourth pre-amplified beam of the first pulsed laser beam, which is after the third pre-amplified beam being reflected by a second mirror and then to be fourth pre-amplified in a reversed direction to be the fourth pre-amplified beam.

7. The laser system of claim 6, wherein the fourth pre-amplified beam of the first pulsed laser beam is received by a second Pockels cell followed by a third isolator, wherein the second Pockels cell operates as a second optical switch to synchronize with the first Pockels cell at an exact time the received fourth pre-amplified first pulsed laser beam arrives for an output or for subsequent amplification, and the third optical isolator protects the second Pockels cell from damages due to reflection, wherein the fourth pre-amplified beam being the pre-amplified first pulsed laser beam having the predefined beam characteristics corresponding to the pulse width setting selection of the controller.

8. The laser system of claim 2, wherein the temporal modulation of the first pulsed laser beam has an adjustable discrete repetition rate between 1 to 20 Hz.

9. The laser system of claim 2, further comprising a feedback circuitry to receive one or a combination of feedback signals comprising:

a first feedback signal sampled at a sample port of the temporal pulse shaper, wherein the first feedback signal causes the controller to perform the following in the integrated fiber laser front-end according to the setting selection of the controller:

configure the arbitrary wave generator and the direct current (DC) bias voltage from the automatic modulator bias control (MBC) circuitry, and modulate the CW laser beam to adjust the pulse shape, the pulse width PW1 and the pulse modulation frequency to counter the magnitude of the error signal until the first pulsed laser beam yields the setting selection of the controller.

10. The laser system of claim 9, wherein the one or a combination of feedback signals comprising:

a second feedback signal sampled at a beam delivery device disposed after the multi-stage post-amplifier, wherein the second feedback signal coupled to a beam detector to generate an error signal which causes the controller to perform one or a combination of the following:

configure the Pockels cell to switch on or off, or to adjust a modified pulse width (PW2) by an amount to stay within the defined tolerance; and configure the multi-stage amplifier to adjust one or a combination of the beam energy amplifications and the beam profile modifications to stay within a defined output energy level and a defined beam profile according to the setting selection.

11. The laser system of claim 10, wherein the error signal is generated by at least one photodetector that detects the sampled portion of the pulsed laser beam at a pickoff position which provides readings from the first or the second pulsed laser beam indicative of at least one of the pulse width, the pulse shape, the first or the second energy level and a corresponding beam diameter.

12. The laser system of claim 1, wherein the pulse shape comprises anyone of a square wave pulse shape, a Gaussian shape, and a user defined arbitrary pulse shape, wherein the pulse width is a user defined setting between 100 ps (picosecond) to 500 ns (nanosecond).

13. The laser system of claim 1, wherein the optical filter comprises:
a beam expander configured to expand the first pulsed beam to a diameter greater than the first diameter, wherein the Gaussian shaped pulse is modified to "flat-top" while the temporal profile remains substantially unchanged.

14. The laser system of claim 1, wherein the multi-stage post-amplifier further comprises:
a third stage configured to post-amplify and modify the fourth pulsed laser beam to output a fifth pulsed laser beam having a fifth energy and a fifth temporal profile; and
a fourth stage configured to post-amplify and modify the fifth pulsed laser beam to output a sixth pulsed laser beam or the output pulsed laser beam having a sixth energy and a sixth temporal profile.

15. The laser system of claim 1, wherein the output beam from the multi-stage post-amplifier to a beam delivery device has near field values and measurements, and wherein the laser beam delivery device includes a vacuum relay imaging module (VRIM) configured to maintain the near field values and the measurements of the output beam and to deliver the output beam to the target part.

16. The laser system of claim 1, wherein the modulator comprises one of a barium borate (BBO) and a potassium dideuterium phosphate (KD*P), wherein the pulsed laser beam is passed through one of the BBO and the KD*P to modify the temporal profile of the pre-amplified first pulsed beam to output a modified first pulsed beam by shaping the modified first pulsed laser beam by one of: slicing of a leading edge of the modified first pulsed laser beam, a trailing edge of the modified first pulsed laser beam, and a combination thereof.

17. The laser system of claim 1, wherein the output pulsed laser beam is delivered to a target through optical waveguides and reflectors in laser shock peening operations or through single optical fiber or a bundle of optical fibers in laser bond inspection operations.

18. The laser system of claim 17, wherein the laser peening is performed on a metallic surface and the laser bond inspection is performed on a composite structure.

19. The laser system of claim 18, wherein in the laser bond inspection on a composite structure, the output pulsed laser beam is directed onto a surface of the composite structure to interrogate an integrity of at least one bonding interface of the defined surface area within the composite structure; wherein:
the composite structure is formed by bonding at least two different layers of materials having the at least one bonding interface formed there between,
the output pulsed laser beam exerts compressive stress waves upon impacting over a defined area size on the surface of the composite structure;
a response of reflected stress waves signature over the defined area size of the surface of the composite structure is measured; and
determine if a bonding defect occurs over the defined area size within the at least one bonding interface formed there between the at least two different layers of materials, according to the response of reflected stress waves signature.

20. The laser system of claim 18, wherein a beam delivery device for carrying out the laser bond inspection on a composite structure comprising a bundle of optical fibers for distributing a plurality of laser beams onto the surface of the composite structure to interrogate the integrity of at least one bonding interface of the defined surface area within the composite structure.

* * * * *